US011611929B2

(12) United States Patent
Li et al.

(10) Patent No.: US 11,611,929 B2
(45) Date of Patent: *Mar. 21, 2023

(54) NETWORK SLICE SELECTION METHOD, RADIO ACCESS DEVICE, AND TERMINAL

(71) Applicant: Huawei Technologies Co., Ltd., Shenzhen (CN)

(72) Inventors: Guorong Li, Shenzhen (CN); Aimin Justin Sang, San Diego, CA (US); Lili Zhang, Beijing (CN); Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,856

(22) Filed: Jul. 23, 2021

(65) Prior Publication Data
US 2021/0352572 A1   Nov. 11, 2021

Related U.S. Application Data

(63) Continuation of application No. 16/325,088, filed as application No. PCT/CN2016/095042 on Aug. 12, 2016, now Pat. No. 11,115,908.

(51) Int. Cl.
*H04W 48/14* (2009.01)
*H04W 76/18* (2018.01)
(Continued)

(52) U.S. Cl.
CPC ............ *H04W 48/14* (2013.01); *H04W 8/24* (2013.01); *H04W 48/18* (2013.01); *H04W 76/18* (2018.02); *H04W 76/27* (2018.02)

(58) Field of Classification Search
CPC ..... H04W 48/14; H04W 76/18; H04W 76/27; H04W 8/24; H04W 48/18
(Continued)

(56) References Cited

U.S. PATENT DOCUMENTS 10,278,123 B2 * 4/2019 Wang .................... H04W 48/10
2004/0044872 A1    3/2004 Scott
(Continued)

FOREIGN PATENT DOCUMENTS

CN    103650437 A    3/2014
CN    104290324 A    1/2015
(Continued)

OTHER PUBLICATIONS

"NGMN 5G White Paper", A Deliverable by the NGMN Alliance, V1.0, Feb. 15, 2015, 125 pages.
(Continued)

*Primary Examiner* — Gbemileke J Onamuti
(74) *Attorney, Agent, or Firm* — Conley Rose, P.C.

(57) ABSTRACT

A network slice selection method, a radio access device, and a terminal, where the method includes obtaining, by a radio access network (RAN) device, network slice information, sending, by the RAN device, a first message to a terminal, where the first message includes the network slice information, receiving, by the RAN device, a first access request message from the terminal after the terminal selects, based on the network slice information, first attribute information of a first network slice to be accessed by the terminal, and selecting, by the RAN device based on the first attribute information of the first network slice, a second network slice to be accessed by the terminal. The method enables an operator to flexibly configure a network slice, and reduces a communication latency and signaling overheads in a process in which a terminal selects a network slice.

20 Claims, 12 Drawing Sheets

(51) Int. Cl.
*H04W 76/27* (2018.01)
*H04W 8/24* (2009.01)
*H04W 48/18* (2009.01)

(58) Field of Classification Search
USPC ............................................................ 370/329
See application file for complete search history.

(56) References Cited

U.S. PATENT DOCUMENTS

| | | | |
|---|---|---|---|
| 2013/0303114 | A1 | 11/2013 | Ahmad et al. |
| 2015/0043382 | A1 | 2/2015 | Arora et al. |
| 2015/0365288 | A1 | 12/2015 | Van Der Merwe et al. |
| 2019/0014515 | A1 | 1/2019 | Zee et al. |
| 2019/0045351 | A1 | 2/2019 | Zee et al. |
| 2019/0387393 | A1 | 12/2019 | Xu et al. |

FOREIGN PATENT DOCUMENTS

| | | |
|---|---|---|
| CN | 105516312 A | 4/2016 |
| CN | 105813195 A | 7/2016 |

OTHER PUBLICATIONS

3GPP TR 22.891 V14.0.0, 3rd Generation Partnership Project;Technical Specification Group Services and System Aspects; Feasibility Study on New Services and Markets Technology Enablers; Stage 1 (Release 14), 95 pages.

3GPP TR 23.799 V0.2.0, 3rd Generation Partnership Project; Technical Specification Group Services and System Aspects; Study on Architecture for Next Generation System (Release 14), 17 pages.

3GPP TR 38.913 V0.3.0, 3rd Generation Partnership Project; Technical Specification Group Radio Access Network; Study on Scenarios and Requirements for Next Generation Access Technologies; (Release 14), Mar. 2016, 30 pages.

NTT Docomo, "New SID Proposal: Study on New Radio Access Technology," 3GPP TSG RAN Meeting #71, RP-160671, Göteborg, Sweden, Mar. 7-10, 2016, 8 pages.

Metis-II White Paper on Preliminary Views and Initial Considerations on 5G Ran Architecture and Functional Design, Published on Mar. 8, 2016, 27 pages.

Samsung, 3GPP TSG-RAN WG3 Meeting #92, R3-161449, "Network slicing selection," Nanjing, China, May 23-27, 2016, 2 pages.

ZTE, 3GPP TSG RAN WG2 Meeting #94, R2-163747, "Discussion on the impact of NW slicing on RAN side," Nanjing, China, May 23-27, 2016, 3 pages.

3GPP TR 22.864 V1.0.0, 3rd Generation Partnership Project; Technical Specification Group Services and System Aspects; Feasibility Study on New Services and Markets Technology Enablers—Network Operation; Stage 1 (Release 14), Feb. 2016, 24 pages.

ZTE, 3GPP TSG RAN WG3 Meeting #92 R3-161107, "Network Slice Selection Procedure", Nanjing, China, May 23-27, 2016, 4 pages.

Ericsson, 3GPP TSG-RAN WG2 #94, R2-164004, "RAN support for network slicing," Nanjing, PRC, May 23-27, 2016, 4 pages.

3GPP TR 38.801 V0.2.0 (Jun. 2016), 3rd Generation Partnership Project; Technical Specification Group Radio Access Network; Study on New Radio Access Technology; Radio Access Architecture and Interfaces (Release 14), Jun. 2016, 20 pages.

"3rd Generation Partnership Project; Technical Specification Group Services and System Aspects; Study on Architecture for Next Generation System (Release 14)," 3GPP TR 23.799, V0.7.0, Aug. 2016, 322 pages.

"3rd Generation Partnership Project; Technical Specification Group Services and System Aspects; Study on Architecture for Next Generation System (Release 14)," 3GPP TR 23.799, V0.7.0, Aug. 2016, 323 pages.

Huawei, et al.,"Update of Solution #1 for Key issue #1," XP051086496, S2-161503, 3GPP SA WG2 Meeting #114, Apr. 11-15, 2016, 4 pages.

Huawei, "Network slice selection," XP051105938, R3-161134, RAN WG3 Meeting #92, May 23-27, 2016, 4 pages.

Nokia, et al., "Solutions for for Network Slice Selection," XP051106154, R3-161356, 3GPP TSG-RAN WG3 Meeting #92, May 23-27, 2016, 6 pages.

Ericsson, "Solution for selection of a network slice instance," XP051121881, S2-164258, SA WG2 Meeting #116, Jul. 11-15, 2016, 6 pages.

S2-163705, ITRI, "Updates to Solution 6.1.3: Location of NSSF and CPSF", SA WG2 Meeting #S2-116, Jul. 11-15, 2016, Vienna, AT, 2 Pages.

NEC, "eDecor Key Issue 1 Solution 3—evaluation," S2-160111, SA WG2 Meeting #113, Jan. 25-30, 2016, 5 pages.

CATT, "Service Triggered Network Slice Selection Procedure," S2-163380, SA WG2 Meeting #116, Jul. 11-15, 2016, 7 pages.

Ericsson et al.,"Solution for selection of a network slice instance", SA WG2 Temporary Document, SA WG2 Meeting #116, Jul. 11-15, 2016, Vienna, AT, S2-164258, 5 pages.

ZTE et al., "Clarification on Network Slicing in RAN," 3GPP TSG RAN WG3 Meeting #92, Nanjing, China, May 23-27, 2016, R3-161106, 5 pages.

\* cited by examiner

NETWORK SLICE SELECTION METHOD, RADIO ACCESS DEVICE, AND TERMINAL

CROSS-REFERENCE TO RELATED APPLICATIONS

This application is a continuation of U.S. patent application Ser. No. 16/325,088 filed on Feb. 12, 2019, which is a National Stage of International Patent Application No. PCT/CN2016/095042 filed on Aug. 12, 2016. Both of the aforementioned applications are hereby incorporated by reference in their entireties.

TECHNICAL FIELD

Embodiments of the present invention relate to the field of communications technologies, and in particular, to a network slice selection method, a radio access device, and a terminal.

BACKGROUND

A fast developing mobile communications system needs to satisfy service requirements of a plurality of scenarios, for example, a mobile broadband service (such as high-definition video), massive machine device communication, and highly-reliable mobile device communication (such as vehicle communication). To satisfy service requirements of different scenarios, a network may be divided into a plurality of network slices. Each slice is formed by deploying a plurality of logical networks as independent service operations, where these logical networks share a physical structure. Unlike slices in the case of deploying an independent network structure, each slice herein should be implemented as a logical network, and the shared structure that is used includes shared processing, storage, and transmission, a shared radio spectrum, and a shared hardware platform. According to the network slice method, structure and part utilization becomes higher. In addition, because the physical structure is shared, costs are reduced, and a slice can be flexibly and independently configured and managed, without affecting stability and security of other slices. However, if a network does not include a network slice identifier pre-allocated to a terminal, or does not include a network slice identifier pre-configured for a terminal, a network slice selection method is required for the terminal to successfully access a network slice.

In the prior art, as shown in FIG. 1, a terminal sends an access request message to a core network (CN) by using a common radio access network (RAN) slice, where the request message carries description information of service performance desired by the terminal. After receiving the message, the CN verifies whether the terminal is authorized to access the network slice. If the terminal is authorized to access a network slice, the CN selects an appropriate network slice identifier for the terminal based on a terminal type or a service performance description information and network slice related information that are provided by the terminal. The terminal sends, to a desired RAN slice, a request message that carries the network slice identifier. A RAN selects a CN entity for the terminal, and then the RAN sends an access request to the CN entity. A network slice on a CN part sends a response message to the terminal by using the RAN, so that the terminal is connected to the CN, and a user plane connection is established.

However, by using the foregoing method, the terminal first accesses a CN common slice and a RAN common slice, and then is directed to a most appropriate network slice. This process increases a communication latency and signaling overheads.

SUMMARY

A network slice selection method, a radio access device, and a terminal provided in embodiments of the present invention enable an operator to flexibly configure a network slice, and reduce a communication latency and signaling overheads in a process in which a terminal selects a network slice.

According to a first aspect, a network slice selection method is provided. The method includes: obtaining, by a radio access device RAN, network slice information (such as first identifier information of a network slice, key service attribute information of the network slice, information about a service supported by the network slice, authorization information of the network slice, core network load information of the network slice, and coverage information of the network slice); sending, by the RAN, a first message to a terminal, where the first message includes the network slice information; receiving, by the RAN, a first access request message that is sent by the terminal after the terminal selects, based on the network slice information, second attribute information (such as first identifier information ID of a network slice, and second identifier information and dedicated access resource information of the network slice) of a first network slice to be accessed by the terminal; and determining, by the RAN based on the second attribute information of the first network slice, a second network slice to be accessed by the terminal. An operator is enabled to flexibly configure a network slice, and further, a communication latency and signaling overheads in a process in which a terminal selects a network slice.

In an optional implementation, the obtaining, by a radio access device RAN, network slice information specifically includes: obtaining, by the RAN, the network slice information from a core network CN or operation, administration and maintenance OAM, so that the operator is enabled to flexibly configure a network slice, and network slice information is obtained extensively.

In an optional implementation, the network slice information includes second attribute information of at least one network slice. Before the sending, by the RAN, a first message to a terminal, the method further includes: determining, by the RAN, dedicated access resource information of each network slice based on the second attribute information of the at least one network slice. The sending, by the RAN, a first message to a terminal specifically includes: sending, by the RAN, the first message to the terminal, where the first message includes the second attribute information of the at least one network slice and the dedicated access resource information of each network slice. The receiving, by the RAN, a first access request message that is sent by the terminal after the terminal selects, based on the network slice information, first attribute information of a first network slice to be accessed by the terminal specifically includes: receiving, by the RAN, the first access request message that is sent by the terminal after the terminal selects, based on the second attribute information of the at least one network slice and the dedicated access resource information of each network slice, the first attribute information of the first network slice to be accessed by the terminal. Because each network slice has corresponding dedicated access resource information, the terminal sends the first access request message to the RAN on a dedicated resource based on dedicated access resource information of the first network slice, so that the RAN quickly detects a network slice corresponding to a service function requested by the terminal, where the first access request message may include indication information (such as a preamble). According to the method, first attribute information of the at least one network slice of the core network may be prevented from being exposed on a radio interface, thereby improving security.

In an optional implementation, the network slice information includes first identifier information of at least one network slice. The sending, by the RAN, a first message to a terminal specifically includes: sending, by the RAN, the first message to the terminal, where the first message includes the first identifier information of the at least one network slice. The receiving, by the RAN, a first access request message that is sent by the terminal after the terminal selects, based on the network slice information, a first network slice to be accessed by the terminal specifically includes: receiving, by the RAN, the first access request message that is sent by the terminal after the terminal selects the first attribute information of the first network slice based on the first identifier information of the at least one network slice, where the first access request message includes first identifier information of the first network slice. By using the method, different network slices are directly distinguished by using the first identifier information of the at least one network slice, and the RAN notifies, by using an initial access response, the terminal of the first attribute information of the at least one network slice, so that the first attribute information of the at least one network slice of the core network may be prevented from being exposed on a radio interface, and security is improved.

In an optional implementation, before the sending, by the RAN, a first message to a terminal, the method further includes: receiving, by the RAN, a third message sent by the terminal, where the third message includes indication information indicating that the terminal is to access the RAN; and sending, by the RAN, the first message to the terminal based on the indication information.

In an optional implementation, the network slice information includes second attribute information of at least one network slice. Before the sending, by the RAN, a first message to a terminal, the method further includes: determining, by the RAN, dedicated access resource information of the at least one network slice and common access resource information of the at least one network slice based on the second attribute information of the at least one network slice; performing, by the RAN, preamble allocation on the network slice based on the common access resource information of the network slice, to obtain information about a network slice group that is obtained through grouping, common access resource information of the network slice group, and a preamble corresponding to the common access resource information of the network slice group; then sending, by the RAN, a fourth message to the terminal, where the fourth message includes the common access resource information of the network slice group, the information about the network slice group, and the preamble corresponding to the common access resource information of the network slice group; receiving, by the RAN, a fifth message sent by the terminal, where the fifth message includes a preamble of a network slice group that is to be accessed by the terminal and that is selected by the terminal based on the common access resource information of the network slice group, the information about the network slice group, and the preamble corresponding to the common access resource information of the network slice group; and then, determining, by the RAN based on the preamble of the network slice group, the network slice group selected by the terminal. The sending, by the RAN, a first message to a terminal specifically includes: sending, by the RAN, the first message to the terminal based on the network slice group, where the first message includes dedicated access resource information of each network slice in the network slice group and second attribute information of each network slice in the network slice group. The receiving, by the RAN, a first access request message that is sent by the terminal after the terminal selects, based on the network slice information, first attribute information of a first network slice to be accessed by the terminal specifically includes: receiving, by the RAN, the first access request message that is sent by the terminal after the terminal selects, based on the second attribute information of the at least one network slice and the dedicated access resource information of each network slice, the first attribute information of the first network slice to be accessed by the terminal and dedicated access resource information of the first network slice. Because each network slice has corresponding dedicated access resource information, the terminal sends the first access request message to the RAN on a dedicated resource based on the dedicated access resource information of the first network slice, so that the RAN quickly detects a network slice corresponding to a service function requested by the terminal, where the first access request message may include indication information (such as a preamble).

In an optional implementation, the network slice information includes second attribute information of at least one network slice. Before the sending, by the RAN, a first message to a terminal, the method further includes: determining, by the RAN, second identifier information of each network slice based on the second attribute information of the at least one network slice. The sending, by the RAN, a first message to a terminal specifically includes: sending, by the RAN, the first message to the terminal, where the first message includes the second identifier information of each network slice. The receiving, by the RAN, a first access request message that is sent by the terminal after the terminal selects, based on the network slice information, first attribute information of a first network slice to be accessed by the terminal specifically includes: receiving, by the RAN, the first access request message that is sent by the terminal after the terminal selects second identifier information of the first network slice based on the second identifier information of the at least one network slice and the second attribute information of the at least one network slice, where the first access request message includes the second identifier information of the first network slice. By using the method, different network slices are distinguished by using the second identifier information of the at least one network slice, and the RAN notifies, by using an initial access response, the terminal of the first attribute information of the at least one network slice and the second identifier information of the at least one network slice, so that the terminal selects a to-be-accessed network slice.

In an optional implementation, the determining, by the RAN based on the first attribute information of the first network slice, a second network slice to be accessed by the terminal specifically includes: when radio resource information of a network slice supported by the RAN does not satisfy a service function supported by the first attribute information of the first network slice, sending, by the RAN, an access request rejection message to the terminal; or selecting, by the RAN for the terminal, a second network slice with a service function the same as that supported by the first attribute information of the first network slice, where the first network slice is different from the second network slice; or when radio resource information of a network slice supported by the RAN satisfies a service function supported by the first attribute information of the first network slice, determining, by the RAN, the second network slice to be accessed by the terminal, where the first network slice is the same as the second network slice.

In an optional implementation, the first access request message further includes attribute information of the terminal. The determining, by the RAN based on the attribute information of the first network slice, a second network slice to be accessed by the terminal specifically includes: when the attribute information of the terminal does not satisfy a service function supported by the first attribute information of the first network slice, sending, by the RAN, an access request rejection message to the terminal; or selecting, by the RAN for the terminal, a second network slice with a service function the same as that supported by the first attribute information of the first network slice, where the first network slice is different from the second network slice; or when the attribute information of the terminal satisfies a service function supported by the attribute information of the first network slice, determining, by the RAN, the second network slice to be accessed by the terminal, where the first network slice is the same as the second network slice.

In an optional implementation, the method further includes: sending, by the RAN, a second access request message to a CN, where the second access request message includes first attribute information of the second network slice that is to be accessed by the terminal and that is determined by the RAN; receiving, by the RAN, a second access response message that is sent by the CN based on second attribute information of the second network slice that is to be accessed by the terminal and that is determined by the RAN; and sending, by the RAN, a first access response message to the terminal, where the first access response message includes the first attribute information of the second network slice that is to be accessed by the terminal and that is selected by the CN, so that the terminal accesses the second network slice.

According to a second aspect, a network slice selection method is provided. The method includes: receiving, by a terminal, a first message sent by a RAN, where the first message includes network slice information obtained by the RAN; selecting, by the terminal, first attribute information of a to-be-accessed first network slice based on the network slice information; and sending, by the terminal, a first access request message to the RAN based on the first attribute information of the first network slice, so that the RAN determines a second network slice to be accessed by the terminal, where the first network slice is the same as or different from the second network slice. An operator is enabled to flexibly configure a network slice, and further, a communication latency and signaling overheads in a process in which a terminal selects a network slice.

In an optional implementation, the network slice information includes second attribute information of at least one network slice. The receiving, by a terminal, a first message sent by a RAN specifically includes: receiving, by the terminal, the first message sent by the RAN, where the first message includes the second attribute information of the at least one network slice and dedicated access resource information of each network slice that is determined by the RAN based on the second attribute information of the at least one network slice. The selecting, by the terminal, first attribute information of a to-be-accessed first network slice based on the network slice information specifically includes: selecting, by the terminal, dedicated access resource information of the to-be-accessed first network slice based on the second attribute information of the at least one network slice and the dedicated access resource information of each network slice. The sending, by the terminal, a first access request message to the RAN based on the first attribute information of the first network slice specifically includes: sending, by the terminal, the first access request message to the RAN on a dedicated access resource of the first network slice based on the dedicated access resource information of the first network slice. Because each network slice has corresponding dedicated access resource information, the terminal sends the first access request message to the RAN on the dedicated resource based on the dedicated access resource information of the first network slice, so that the RAN quickly detects a network slice corresponding to a service function requested by the terminal, where the first access request message may include indication information (such as a preamble). According to the method, first attribute information of the at least one network slice of a core network may be prevented from being exposed on a radio interface, thereby improving security.

In an optional implementation, the network slice information includes first identifier information of at least one network slice. The receiving, by a terminal, a first message sent by a RAN specifically includes: receiving, by the terminal, the first message sent by the RAN, where the first message includes the first identifier information of the at least one network slice. The selecting, by the terminal, first attribute information of a to-be-accessed first network slice based on the network slice information specifically includes: selecting, by the terminal, first identifier information of the to-be-accessed first network slice based on the first identifier information of the at least one network slice. The sending, by the terminal, a first access request message to the RAN based on the first attribute information of the first network slice specifically includes: sending, by the terminal, the first access request message to the RAN based on the first identifier information of the first network slice, where the first access request message includes the first identifier information of the first network slice.

In an optional implementation, before the receiving, by a terminal, a first message sent by a RAN, the method further includes: sending, by the terminal, a second message to the RAN, where the second message includes indication information indicating that the terminal is to access the RAN; and receiving, by the terminal, the first message that is sent by the RAN based on the indication information.

In an optional implementation, the network slice information includes second attribute information of at least one network slice. Before the receiving, by a terminal, a first message sent by a RAN, the method further includes: receiving, by the terminal, a third message sent by the RAN, where the third message includes common access resource information of the at least one network slice and dedicated access resource information of the at least one network slice that are determined by the RAN based on the second attribute information of the at least one network slice, and information about a network slice group that is obtained through grouping, common access resource information of the network slice group, and a preamble corresponding to the common access resource information of the network slice group that are obtained by the RAN by performing preamble allocation on the network slice based on the common access resource information of the network slice;

selecting, by the terminal, a to-be-accessed network slice group based on the information about the network slice group, the common access resource information of the network slice group, and the preamble corresponding to the common access resource information of the network slice group; and sending, by the terminal, a fourth message to the RAN, where the fourth message includes a preamble of the to-be-accessed network slice group. The receiving, by a terminal, a first message sent by a RAN specifically includes: receiving, by the terminal, the first message that is sent by the RAN after the RAN determines the network slice group based on the preamble of the network slice group, where the first message includes dedicated access resource information of each network slice in the network slice group and attribute information of each network slice in the network slice group. The selecting, by the terminal, first attribute information of a to-be-accessed first network slice based on the network slice information specifically includes: selecting, by the terminal, dedicated access resource information of the to-be-accessed first network slice based on the dedicated access resource information of each network slice in the network slice group and the attribute information of each network slice in the network slice group. The sending, by the terminal, a first access request message to the RAN based on the first attribute information of the first network slice specifically includes: sending, by the terminal, the first access request message to the RAN on a dedicated access resource of the first network slice based on the dedicated access resource information of the first network slice. Because each network slice has corresponding dedicated access resource information, the terminal sends the first access request message to the RAN on the dedicated resource based on the dedicated access resource information of the first network slice, so that the RAN quickly detects a network slice corresponding to a service function requested by the terminal, where the first access request message may include indication information (such as a preamble).

In an optional implementation, the network slice information includes second attribute information of at least one network slice. The receiving, by a terminal, a first message sent by a RAN specifically includes: receiving, by the terminal, the first message sent by the RAN, where the first message includes second identifier information of the at least one network slice that is determined by the RAN based on the second attribute information of the at least one network slice. The selecting, by the terminal, first attribute information of a to-be-accessed first network slice based on the network slice information specifically includes: selecting, by the terminal, second identifier information of the to-be-accessed first network slice based on the second identifier information of the at least one network slice. The sending, by the terminal, a first access request message to the RAN based on the first attribute information of the first network slice specifically includes: sending, by the terminal, the first access request message to the RAN based on the second identifier information of the first network slice, where the first access request message includes the second identifier information of the first network slice. By using the method, different network slices are distinguished by using the second identifier information of the at least one network slice, and the RAN notifies, by using an initial access response, the terminal of the first attribute information of the at least one network slice and the second identifier information of the at least one network slice, so that the terminal selects a to-be-accessed network slice.

In an optional implementation, the network slice information includes second attribute information of at least one network slice. The selecting, by the terminal, first attribute information of a to-be-accessed first network slice based on the network slice information is specifically: selecting, by the terminal, the first attribute information of the to-be-accessed first network slice from the second attribute information of the at least one network slice based on attribute information of the terminal.

In an optional implementation, the method further includes: receiving, by the terminal, a first access response message that is sent by the RAN based on first attribute information of the second network slice, where the first access response message includes the first attribute information of the second network slice that is to be accessed by the terminal and that is selected by a core network CN, so that the terminal accesses the second network slice.

According to a third aspect, a radio access device is provided. The radio access device may include: a processor, configured to obtain network slice information; a transmitter, configured to send a first message to a terminal, where the first message includes the network slice information; and a receiver, configured to receive a first access request message that is sent by the terminal after the terminal selects, based on the network slice information, first attribute information of a first network slice to be accessed by the terminal, where the processor is configured to determine, based on the first attribute information of the first network slice, a second network slice to be accessed by the terminal.

In an optional implementation, the processor is specifically configured to obtain the network slice information from a core network CN or operation, administration and maintenance OAM.

In an optional implementation, the network slice information includes second attribute information of at least one network slice. Before the transmitter sends the first message to the terminal, the processor is further configured to determine dedicated access resource information of each network slice based on the second attribute information of the at least one network slice. The transmitter is specifically configured to send, for the RAN, the first message to the terminal, where the first message includes the second attribute information of the at least one network slice and the dedicated access resource information of each network slice. The receiver is specifically configured to receive the first access request message that is sent by the terminal after the terminal selects, based on the second attribute information of the at least one network slice and the dedicated access resource information of each network slice, the first attribute information of the first network slice to be accessed by the terminal.

In an optional implementation, the network slice information includes first identifier information of at least one network slice. The transmitter is specifically configured to send the first message to the terminal, where the first message includes the first identifier information of the at least one network slice. The receiver is specifically configured to receive the first access request message that is sent by the terminal after the terminal selects the first attribute information of the first network slice based on the first identifier information of the at least one network slice, where the first access request message includes first identifier information of the first network slice.

In an optional implementation, before the transmitter sends the first message to the terminal, the receiver is further configured to receive a third message sent by the terminal, where the third message includes indication information indicating that the terminal is to access the RAN; and the transmitter sends the first message to the terminal based on the indication information.

In an optional implementation, the network slice information includes second attribute information of at least one network slice. Before the transmitter sends the first message to the terminal, the processor is further configured to determine dedicated access resource information of the at least one network slice and common access resource information of the at least one network slice based on the second attribute information of the at least one network slice; the processor is further configured to perform preamble allocation on the network slice based on the common access resource information of the network slice, to obtain information about a network slice group that is obtained through grouping, common access resource information of the network slice group, and a preamble corresponding to the common access resource information of the network slice group; the transmitter is further configured to send a fourth message to the terminal, where the fourth message includes the common access resource information of the network slice group, the information about the network slice group, and the preamble corresponding to the common access resource information of the network slice group; the receiver is further configured to receive a fifth message sent by the terminal, where the fifth message includes a preamble of a network slice group that is to be accessed by the terminal and that is selected by the terminal based on the common access resource information of the network slice group, the information about the network slice group, and the preamble corresponding to the common access resource information of the network slice group; and the processor is further configured to determine, based on the preamble of the network slice group, the network slice group selected by the terminal. The transmitter is specifically configured to send the first message to the terminal based on the network slice group, where the first message includes dedicated access resource information of each network slice in the network slice group and second attribute information of each network slice in the network slice group. The receiver is specifically configured to receive the first access request message that is sent by the terminal after the terminal selects, based on the second attribute information of the at least one network slice and the dedicated access resource information of each network slice, the first attribute information of the first network slice to be accessed by the terminal and dedicated access resource information of the first network slice.

In an optional implementation, the network slice information includes second attribute information of at least one network slice. Before the transmitter sends the first message to the terminal, the processor is further configured to determine second identifier information of each network slice based on the second attribute information of the at least one network slice. The transmitter is specifically configured to send the first message to the terminal, where the first message includes the second identifier information of each network slice. The receiver is specifically configured to receive the first access request message that is sent by the terminal after the terminal selects second identifier information of the first network slice based on the second identifier information of the at least one network slice and the second attribute information of the at least one network slice, where the first access request message includes the second identifier information of the first network slice.

In an optional implementation, the processor is specifically configured to: when radio resource information of a network slice supported by the RAN does not satisfy a service function supported by the first attribute information of the first network slice, the processor instructs the transmitter to send an access request rejection message to the terminal; or the processor selects, for the terminal, a second network slice with a service function the same as that supported by the first attribute information of the first network slice, where the first network slice is different from the second network slice; or when radio resource information of a network slice supported by the RAN satisfies a service function supported by the first attribute information of the first network slice, the processor determines the second network slice to be accessed by the terminal, where the first network slice is the same as the second network slice.

In an optional implementation, the first access request message further includes attribute information of the terminal. The processor is specifically configured to: when the attribute information of the terminal does not satisfy a service function supported by the first attribute information of the first network slice, the processor instructs the transmitter to send an access request rejection message to the terminal; or the processor selects, for the terminal, a second network slice with a service function the same as that supported by the first attribute information of the first network slice, where the first network slice is different from the second network slice; or when the attribute information of the terminal satisfies a service function supported by the attribute information of the first network slice, the processor determines the second network slice to be accessed by the terminal, where the first network slice is the same as the second network slice.

In an optional implementation, the transmitter is further configured to send a second access request message to a CN, where the second access request message includes first attribute information of the second network slice that is to be accessed by the terminal and that is determined by the processor; the receiver is further configured to receive a second access response message that is sent by the CN based on second attribute information of the second network slice that is to be accessed by the terminal and that is determined by the processor; and the transmitter is further configured to send a first access response message to the terminal, where the first access response message includes the first attribute information of the second network slice that is to be accessed by the terminal and that is selected by the CN, so that the terminal accesses the second network slice.

According to a fourth aspect, a computer storage medium is provided. The computer storage medium is configured to store a computer software instruction used by the foregoing terminal. The computer software instruction includes a program designed for executing the foregoing aspects.

According to a fifth aspect, a terminal is provided. The terminal may include: a receiver, configured to receive a first message sent by a RAN, where the first message includes network slice information obtained by the RAN; a processor, configured to select first attribute information of a to-be-accessed first network slice based on the network slice information received by the receiver; and a transmitter, configured to send a first access request message to the RAN based on the first attribute information of the first network slice selected by the processor, so that the RAN determines a second network slice to be accessed by the terminal.

In an optional implementation, the network slice information includes second attribute information of at least one network slice. The receiver is specifically configured to receive the first message sent by the RAN, where the first message includes the second attribute information of the at least one network slice and dedicated access resource information of each network slice that is determined by the RAN based on the second attribute information of the at least one network slice. The processor is specifically configured to select dedicated access resource information of the to-be-accessed first network slice based on the second attribute information of the at least one network slice and the dedicated access resource information of each network slice. The transmitter is specifically configured to send the first access request message to the RAN on a dedicated access resource of the first network slice based on the dedicated access resource information of the first network slice.

In an optional implementation, the network slice information includes first identifier information of at least one network slice. The receiver is specifically configured to receive the first message sent by the RAN, where the first message includes the first identifier information of the at least one network slice. The processor is specifically configured to select first identifier information of the to-be-accessed first network slice based on the first identifier information of the at least one network slice. The transmitter is specifically configured to send the first access request message to the RAN based on the first identifier information of the first network slice, where the first access request message includes the first identifier information of the first network slice.

In an optional implementation, before the receiver receives the first message sent by the RAN, the transmitter is further configured to send a second message to the RAN, where the second message includes indication information indicating that the terminal is to access the RAN; and the receiver is further configured to receive the first message that is sent by the RAN based on the indication information.

In an optional implementation, the network slice information includes second attribute information of at least one network slice. Before the receiver receives the first message sent by the RAN, the receiver is further configured to receive a third message sent by the RAN, where the third message includes common access resource information of the at least one network slice and dedicated access resource information of the at least one network slice that are determined by the RAN based on the second attribute information of the at least one network slice, and information about a network slice group that is obtained through grouping, common access resource information of the network slice group, and a preamble corresponding to the common access resource information of the network slice group that are obtained by the RAN by performing preamble allocation on the network slice based on the common access resource information of the network slice; the processor is further configured to select a to-be-accessed network slice group based on the information about the network slice group, the common access resource information of the network slice group, and the preamble corresponding to the common access resource information of the network slice group; and the transmitter is further configured to send a fourth message to the RAN, where the fourth message includes a preamble of the to-be-accessed network slice group. The receiver is specifically configured to receive the first message that is sent by the RAN after the RAN determines the network slice group based on the preamble of the network slice group, where the first message includes dedicated access resource information of each network slice in the network slice group and attribute information of each network slice in the network slice group. The processor is specifically configured to select dedicated access resource information of the to-be-accessed first network slice based on the dedicated access resource information of each network slice in the network slice group and the attribute information of each network slice in the network slice group. The transmitter is specifically configured to send the first access request message to the RAN on a dedicated access resource of the first network slice based on the dedicated access resource information of the first network slice.

In an optional implementation, the network slice information includes second attribute information of at least one network slice. The receiver is specifically configured to receive the first message sent by the RAN, where the first message includes second identifier information of the at least one network slice that is determined by the RAN based on the second attribute information of the at least one network slice. The processor is specifically configured to select second identifier information of the to-be-accessed first network slice based on the second identifier information of the at least one network slice. The transmitter is specifically configured to send the first access request message to the RAN based on the second identifier information of the first network slice, where the first access request message includes the second identifier information of the first network slice.

In an optional implementation, the network slice information includes second attribute information of at least one network slice. The processor is specifically configured to select the first attribute information of the to-be-accessed first network slice from the second attribute information of the at least one network slice based on attribute information of the terminal.

In an optional implementation, the receiver is further configured to receive a first access response message that is sent by the RAN based on first attribute information of the second network slice, where the first access response message includes the first attribute information of the second network slice that is to be accessed by the terminal and that is selected by a core network CN, so that the terminal accesses the second network slice.

According to still another aspect, a computer storage medium is provided. The computer storage medium is configured to store a computer software instruction used by the foregoing terminal. The computer software instruction includes a program designed for executing the foregoing aspects.

DESCRIPTION OF EMBODIMENTS

The following further describes the technical solutions of the present invention in detail with reference to accompanying drawings and embodiments.

A network slice selection method provided in the present invention may be applicable to a Long Term Evolution (Long Term Evolution, LTE) system, or other radio communications systems using various radio access technologies, for example, a system using an access technology such as Code Division Multiple Access, Frequency Division Multiple Access, Time Division Multiple Access, orthogonal frequency division multiple access, or single carrier frequency division multiple access, and may also be applicable to a system subsequently evolved from the LTE system, such as a 5th generation 5G system. In addition, the network slice selection method may also be applicable to a WLAN system.

Figure 1:
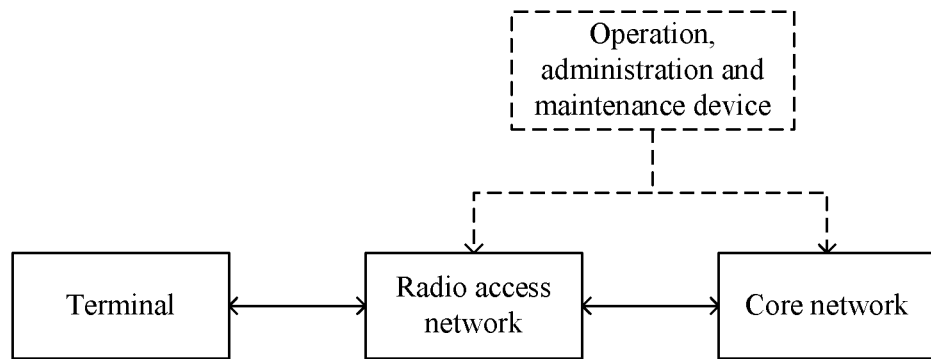
FIG. 1 is a schematic structural diagram of a network slice selection system according to an embodiment of the present invention.

A system framework shown in FIG. 1 may include a terminal, a radio access device (Radio Access Network, RAN), and a core network. The RAN is configured to provide various types of terminals with mobility management, link management, and handover management. The terminal is connected to the core network by using the RAN. The core network is configured to control a process in which the terminal establishes a communications service.

Optionally, the system framework may further include an operation, administration and maintenance (Operation Administration and Maintenance, OAM) device, and an operator may perform information configuration on the RAN and/or the core network by using the OAM device depending on a design requirement.

The terminal may be referred to as user equipment (User Equipment, UE), a mobile station (Mobile Station, MS), a mobile terminal (mobile terminal), a computer, a microcomputer, or the like, or may be a 5G terminal. For example, the terminal may be a mobile phone (or referred to as a "cellular" phone), a mobile computer, a computer with a mobile terminal, or a smartwatch. For example, the terminal may alternatively be a portable, pocket-sized, handheld, computer built-in, or in-vehicle mobile apparatus, which exchanges voice and/or data with the radio access device. The present invention sets no limitation thereto. For example, the terminal further includes a wired access terminal that has a multi-carrier feature.

The core network includes but is not limited to a core network (Core Network, CN) in the LTE system, a 5G core network, and a next-generation core network. The core network may include a plurality of network slices. Each slice serves a particular service. The network slices include, for example, an emergency machine type communication (Machine Type Communication, MTC) slice, a massive machine type communication (Machine Type Communication, MTC) slice, and a mobile broadband (Mobile Broad Band, MBB) slice. The emergency MTC slice may serve a service (such as a pilotless automobile service) with a low latency and a small data amount. The massive MTC slice serves a large quantity of latency-tolerant services (such as sensor or wearable device services) that have a small data amount and that are not subject to frequent access. The MBB slice is used for a service (such as a high-definition movie service) that has a high data rate and high mobility.

The radio access device RAN includes but is not limited to an evolved NodeB (evolved NodeB, eNB), a home evolved NodeB (Home evolved NodeB, HeNB), a relay, a home NodeB Femto, a micro base station Pico, and a 5G base station. The RAN and the core network may exchange network slice information through signaling transmission. From a perspective of a composition structure, the RAN may include a physical layer, a layer 2, and an RRC layer. The layer 2 may include a Media Access Control (Medium Access Control, MAC) layer, a Packet Data Convergence Protocol (Packet Data Convergence Protocol, PDCP) layer, and a Radio Link Control (Radio Link Control, RLC) layer. From a perspective of access resource information, the RAN may include three models for supporting the network slices of the core network. Access information may include a physical layer access resource, a MAC layer access function, and an RRC layer access function. The three models may be as follows.

Figure 2A:
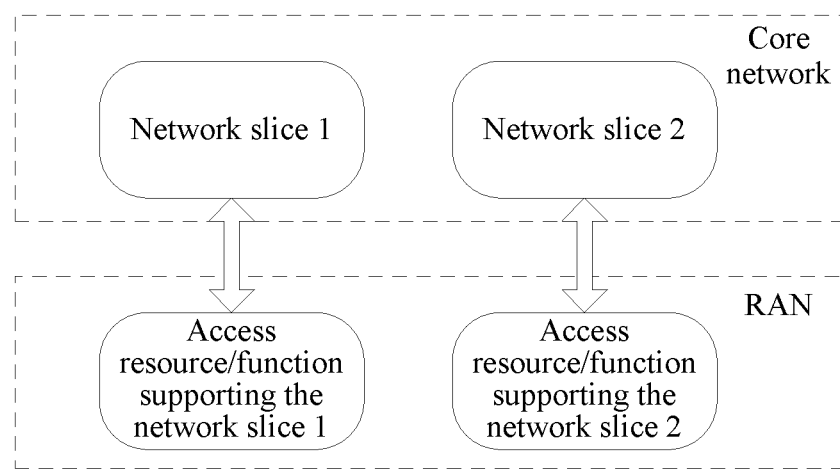
FIG. 2A is a schematic structural diagram of a model of a RAN.

Model 1: Physical layer access resources, layer 2 access functions, and Radio Resource Control (Radio Resource Control, RRC) layer access functions of different network slices are completely separated, namely, access information of different network slices is completely separated on the RAN. As shown in FIG. 2A, when the core network includes two different network slices, the RAN includes access resources or functions corresponding to the two different network slices.

Figure 2B:
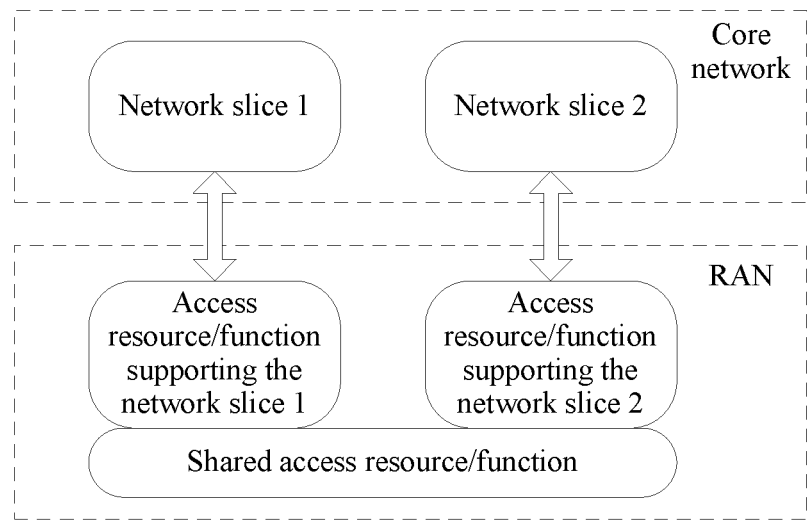
FIG. 2B is a schematic structural diagram of another model of a RAN.

Model 2: Physical layer access resources of different network slices are shared, and layer 2 access functions and RRC layer access functions are completely separated, namely, different network slices share partial access information. As shown in FIG. 2B, when the core network includes two different network slices, the RAN not only includes access resources or functions corresponding to the two different network slices, but also includes an access resource or function shared by the two different network slices.

It may be understood that, in model 2, access resources/functions may be divided into two phases, where an access resource/function of a phase 1 is shared by all slices (such as a random access channel (Random Access Channel, RACH) resource in LTE); and an access resource/function of a phase 2 is dedicated to each slice.

Figure 2C:
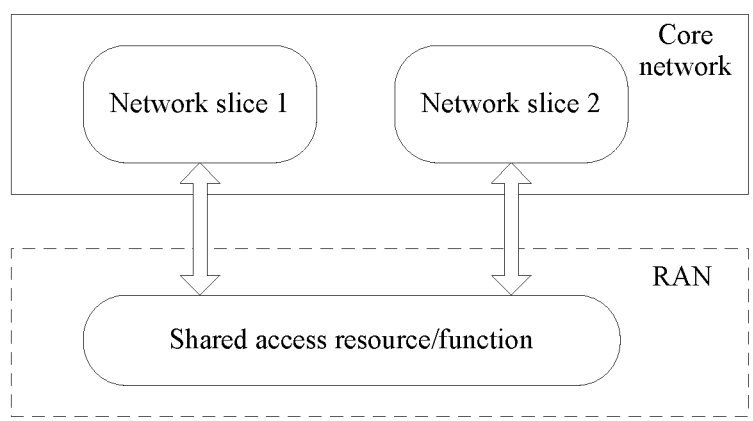
FIG. 2C is a schematic structural diagram of still another model of a RAN.

Model 3: Physical layer access resources, layer 2 access functions, and RRC layer access functions of different network slices are completely shared, namely, different network slices completely share access information. As shown in FIG. 2C, when the core network includes two different network slices, the RAN includes an access resource or function shared by the two different network slices.

It can be learned that, in FIG. 1, various types of terminals access different core network slices by using different models of the RAN, so that the core network finally controls the terminals to perform particular communications services.

Figure 3:
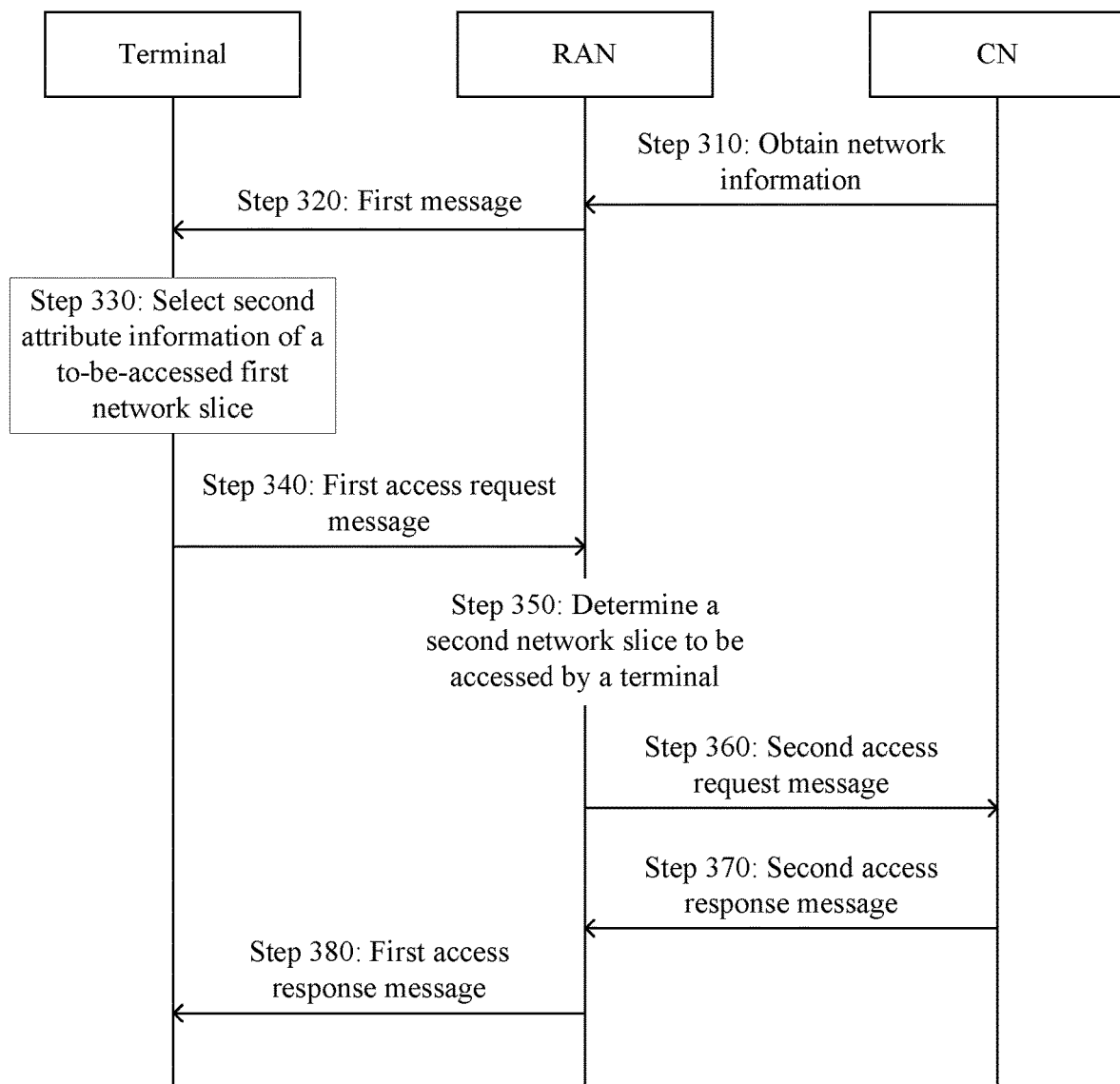
FIG. 3 is a signaling interaction diagram of a network slice selection method according to an embodiment of the present invention.

FIG. 3 is a signaling interaction diagram of a network slice selection method according to an embodiment of the present invention. As shown in FIG. 3, the method may include the following steps.

Step 310: A radio access device RAN obtains network slice information.

Optionally, the radio access device RAN may obtain the network slice information from a core network CN or operation, administration and maintenance OAM in the following manners.

The RAN may obtain the network slice information in the following manners.

In a first manner, the RAN obtains the network slice information from the CN.

Figure 4A:
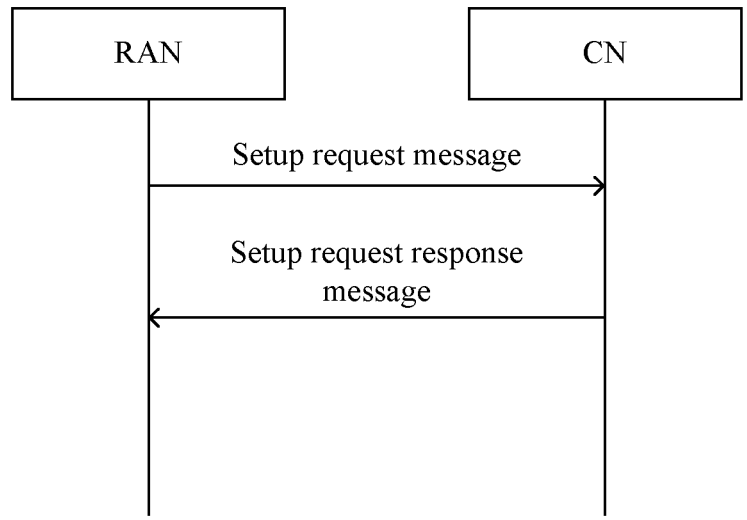
FIG. 4A is a signaling interaction diagram of obtaining, by a RAN, network slice information according to an embodiment of the present invention.

As shown in FIG. 4A, in a connection setup process between the RAN and the CN, the RAN sends a setup request message to the CN, where the setup request message may include a RAN capability for slice support IE (RAN capability for slice support IE), and the CN sends a setup request response message to the RAN, where the setup request response message may include at least one piece of network slice information, so that the RAN obtains the network slice information.

Figure 4B:
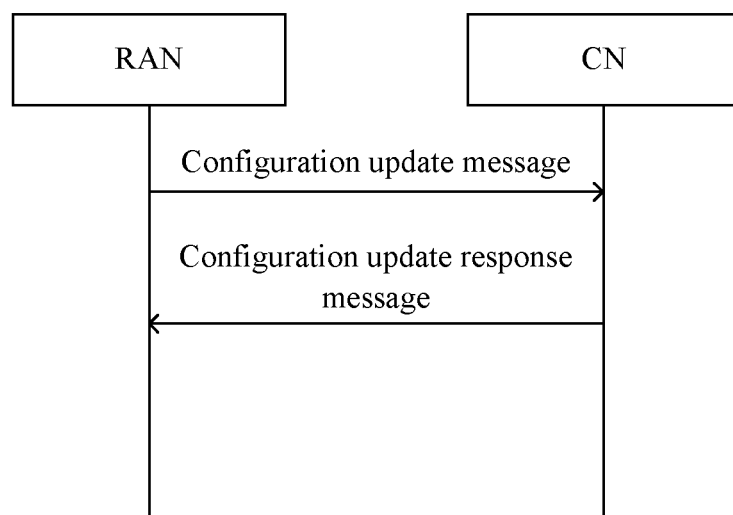
FIG. 4B is another signaling interaction diagram of obtaining, by a RAN, network slice information according to an embodiment of the present invention.

As shown in FIG. 4B, in a configuration update process, the CN sends a configuration update message to the RAN, where the configuration update message may include at least one piece of network slice information modified by the CN, so that the RAN obtains the network slice information.

In a second manner, the RAN obtains the network slice information from the OAM device.

When the RAN starts, in a configuration update process, the OAM device may send a configuration message to the RAN, where the configuration message may include at least one piece of network slice information, so that the RAN obtains the network slice information. It should be noted that, the OAM device may configure, depending on a design requirement of an operator, the network slice information sent to the RAN. In other words, a process in which the RAN obtains the network slice information from the OAM device is operator-configurable to some extent.

The network slice information may include first attribute information of at least one network slice. First attribute information of a network slice may include one or more of the following: first identifier information (Identification, ID) of the network slice, key service attribute information of the network slice, information about a service supported by the network slice, authorization information of the network slice, core network load information of the network slice, coverage information of the network slice, and the like.

Using three network slice as an example, key service attributes of the network slices may include: enhanced machine type communication (Enhanced Machine Type Communication, eMBB) of a network slice 1, Enhanced Mobile BroadBand (Enhanced Mobile Broad Band, eMTC) of a network slice 2, and Ultra-reliable and Low Latency Communications (Ultra-reliable and Low Latency Communications, URLLC), vehicle communication (Vehicle to X, V2X), or the like of a network slice 3.

The service supported by the network slice may include indicating quality of service (Quality of Service, QoS), a quality of service class identifier (QoS Class Identifier, QCI), or the like of a service.

The authorization information of the network slice may include information about access permission of the core network for a service function of the terminal.

The core network load information of the network slice may include load information of each network slice on the core network.

The coverage information of the network slice may include coverage area information during service execution of the network slice.

It should be noted that, the foregoing two manners do not constitute a limitation on how the RAN obtains a network slice, and the RAN may alternatively obtain the network slice information in another manner, for example, obtain the network slice information from the OAM device in a network optimization manner.

Optionally, in a process in which the RAN obtains the network slice information, if an access resource or function of the RAN cannot satisfy a requirement of at least one network slice provided by the CN, the RAN may select to support only some network slices of the CN. For example, the RAN may select, based on priorities of network slices provided by the CN, a network slice supported by the access resource or function of the RAN.

The RAN may indicate, through signaling transmission (such as a configuration update response message), a network slice that currently can be supported by the RAN, and add modified network slice information to a system message or an access response message.

Step 320: The RAN sends a first message to a terminal, where the first message may include the network slice information.

The RAN sends the first message to the terminal, where the first message may be a broadcast system message, or an access response message, and the system message or the access response message carries the obtained network slice information, so that the terminal obtains the network slice information. The network slice information may include the first attribute information of the at least one network slice.

Step 330: The terminal selects, based on the network slice information sent by the RAN, second attribute information of a to-be-accessed first network slice.

The terminal selects the second attribute information of the to-be-accessed first network slice from the first attribute information of the at least one network slice in the network slice information based on attribute information of the terminal (such as service information, radio resource information, and mobility information of the terminal).

The second attribute information of the first network slice may be the same as or different from the first attribute information of the network slice. The second attribute information of the first network slice may include but be not limited to first identifier information ID of the network slice, second identifier information of the network slice (such as a preamble of the network slice, a signal of the network slice, and a sequence of the network slice), and dedicated access resource information.

The terminal may select the second attribute information of the first network slice in the following aspects.

In an aspect of a service, the terminal may select first attribute information, of a network slice, that is corresponding to a network slice matching the service information of the terminal as the second attribute information of the to-be-accessed first network slice.

In an aspect of a radio resource, when different network slices have individual radio resources, the terminal may select first attribute information, of a network slice, that is corresponding to a network slice with best radio quality as the second attribute information of the to-be-accessed first network slice; or select first attribute information, of a network slice, that is corresponding to a network slice with radio quality exceeding a specific threshold as the second attribute information of the to-be-accessed first network slice.

When core network load information of each network slice is provided in the network slice information received by the terminal, the terminal may select first attribute information, of a network slice, that is corresponding to a network slice with relatively low load as the second attribute information of the to-be-accessed first network slice.

When authorization information of each network slice is provided in the network slice information received by the terminal, the terminal may select first attribute information, of a network slice, that is corresponding to an authorized network slice as the second attribute information of the to-be-accessed first network slice.

When coverage information of each network slice is provided in the network slice information received by the terminal, the terminal may select, by considering mobility of the terminal, first attribute information, of a network slice, that is corresponding to a network slice as the second attribute information of the to-be-accessed first network slice. For example, when the terminal moves at a high speed, the terminal may select a network slice with a large coverage; or when the terminal moves at a low speed, the terminal may select a network slice with a small coverage.

It should be noted that, for each of the foregoing aspects, the terminal may determine a capability of each aspect by using a weight. The weight may be pre-configured by the terminal, or may be sent by the RAN or the CN to the terminal.

Step 340: The terminal sends a first access request message to the RAN.

The first access request message may include the second attribute information of the first network slice to be accessed by the terminal, or may include indication information (such as a preamble) of a cell covered by the RAN. The first access request message may be an RRC connection request (RRC connection request) message or an RRC connection setup complete (RRC connection setup complete) message.

Optionally, the first access request message may further include the attribute information of the terminal, such as a service, a radio resource, and mobility of the terminal, so that the RAN quickly selects a network slice.

Step 350: The RAN determines, based on the second attribute information of the first network slice, a second network slice to be accessed by the terminal.

The RAN performs selection and judgment on the second attribute information of the first network slice, to determine the second network slice to be accessed by the terminal.

Optionally, when the RAN performs selection and judgment on the second attribute information of the first network slice, the second network slice to be accessed by the terminal may alternatively be determined by using radio resource information of a network slice supported by the RAN (such as radio resource load of the network slice supported by the RAN).

When the radio resource information of the network slice supported by the RAN does not satisfy a service function requirement supported by the second attribute information of the first network slice, the RAN sends a first access request rejection message to the terminal, so that the terminal re-selects attribute information of the first network slice; or the RAN selects, for the terminal, a second network slice with a service function the same as that supported by the second attribute information of the first network slice, where the first network slice is different from the second network slice.

When the attribute information of the network slice supported by the RAN satisfies a service function requirement supported by the second attribute information of the first network slice, the RAN determines the second network slice to be accessed by the terminal, where the first network slice is the same as the second network slice.

Optionally, when the RAN performs selection and judgment on the second attribute information of the first network slice, the second network slice to be accessed by the terminal may alternatively be determined by considering the attribute information of the terminal (such as the service, the radio resource, and the mobility of the terminal).

When the attribute information of the terminal does not satisfy a service function requirement supported by the second attribute information of the first network slice, the RAN sends a first access request rejection message to the terminal, so that the terminal re-selects attribute information of the first network slice; or the RAN selects, for the terminal, a second network slice with a service function the same as that supported by the second attribute information of the first network slice, where the first network slice is different from the second network slice.

When the attribute information of the terminal satisfies a service function requirement supported by the second attribute information of the first network slice, the RAN determines the second network slice to be accessed by the terminal, where the first network slice is the same as the second network slice.

It should be noted that, when the RAN performs selection and judgment on the second attribute information of the first network slice, the second network slice to be accessed by the terminal may be determined by separately using the radio resource information of the network slice supported by the RAN and the attribute information of the terminal, or may be determined by using both the radio resource information of the network slice supported by the RAN and the attribute information of the terminal. Further, another factor may be added depending on a design requirement.

Step 360: The RAN sends a second access request message to a core network, where the second access request message includes second attribute information of the second network slice that is to be accessed by the terminal and that is determined by the RAN.

Optionally, the core network may perform permission judgment on a request of the terminal. If the core network has a permission limitation on an access request of the terminal, the core network sends a second access request rejection message to the RAN. In this case, the RAN may select, for the terminal, a second network slice with a service function the same as that supported by the second attribute information of the first network slice, or may send the first access request rejection message to the terminal, so that the terminal re-selects second attribute information of the first network slice.

Step 370: The RAN receives a second access response message that is sent by the CN based on the second attribute information of the second network slice that is to be accessed by the terminal and that is determined by the RAN.

Step 380: The RAN sends a first access response message to the terminal, where the first access response message includes the second attribute information of the second network slice that is to be accessed by the terminal and that is selected by the CN, so that the terminal accesses the second network slice.

According to the network slice selection method provided in this embodiment of the present invention, the radio access device RAN obtains the network slice information; then the RAN sends the first message to the terminal, where the first message includes the network slice information; the RAN receives the first access request message that is sent by the terminal after the terminal selects, based on the network slice information, the first attribute information of the first network slice to be accessed by the terminal; and the RAN determines, based on the first attribute information of the first network slice, the second network slice to be accessed by the terminal, where the first network slice is the same as or different from the second network slice. The method enables an operator to flexibly configure a network slice, and further reduces a communication latency and signaling overheads in a process in which a terminal selects a network slice.

The following specifically describes methods for selecting a second network slice of a core network based on different models of a RAN by using an example in which a RAN obtains a network information slice from a core network CN.

Figure 5:
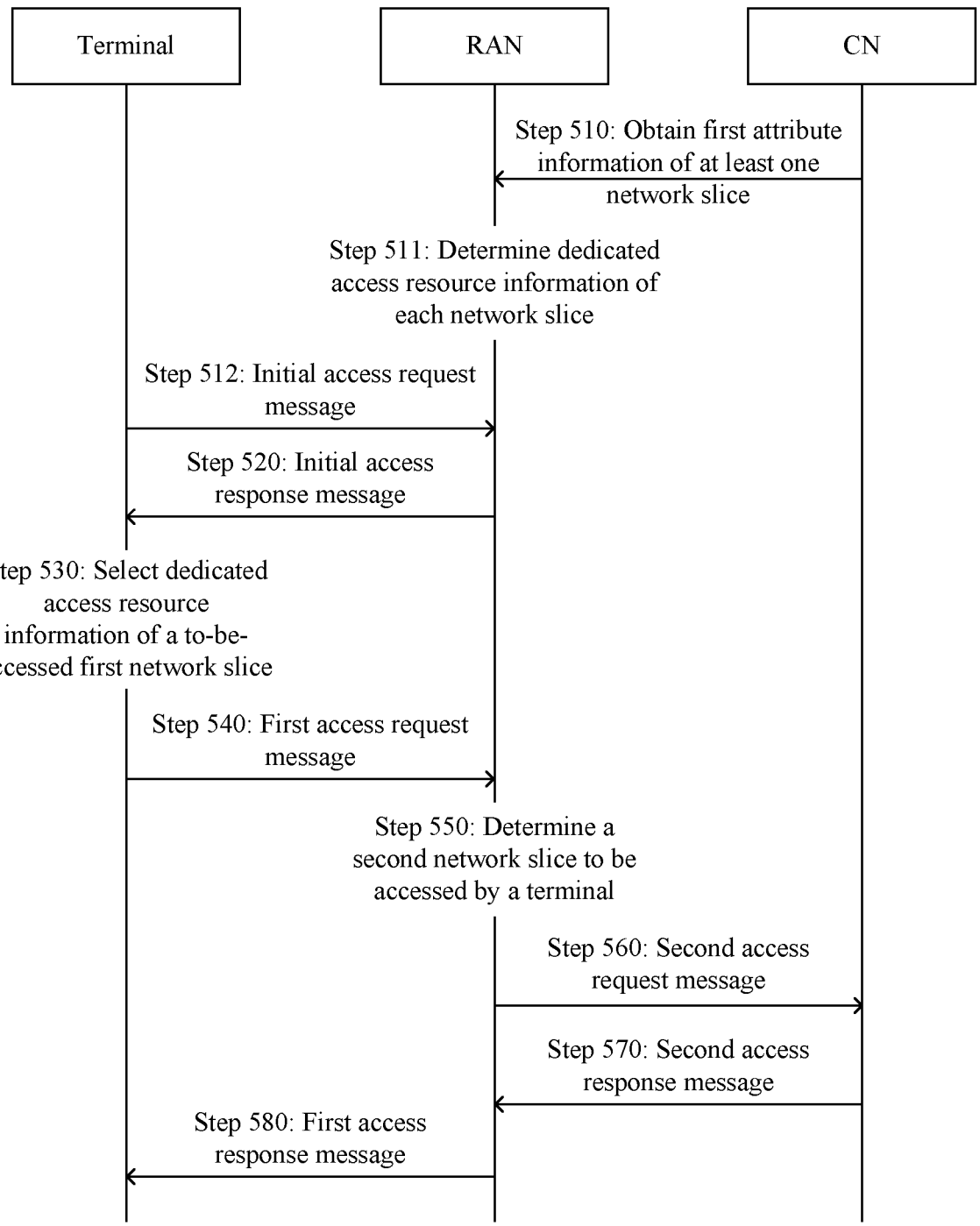
FIG. 5 is a signaling interaction diagram of another network slice selection method shown in FIG. 3.

FIG. 5 is a signaling interaction diagram of another network slice selection method shown in FIG. 3. As shown in FIG. 5, the method is applied to a mode 2 of a RAN. The method may include the following steps.

Step 510: The radio access device RAN obtains first attribute information of at least one network slice from a core network CN.

Step 520: The RAN sends a first message to a terminal, where the first message may include the first attribute information of the at least one network slice.

Optionally, before the RAN sends the first message to the terminal, the RAN determines dedicated access resource information of each network slice based on the first attribute information of the at least one network slice. The RAN sends a system message to the terminal, where the system message may include indication information (such as a preamble) of a cell covered by the RAN.

The terminal sends a second message (such as an initial access request message) to the RAN on a common resource, where the second message may include indication information (such as a preamble), to indicate that the terminal is to access the RAN.

That the RAN sends a first message to a terminal in step 520 is specifically: sending, by the RAN, the first message to the terminal on the common resource based on the received second message, where the first message may include the first attribute information of the at least one network slice and the dedicated access resource information of each network slice, and the first message may be an initial access response message.

Step 530: The terminal selects dedicated access resource information of a to-be-accessed first network slice based on the first attribute information of the at least one network slice.

The terminal selects the dedicated resource information of the to-be-accessed first network slice from the first attribute information of the at least one network slice and the dedicated access resource information of each network slice based on attribute information of the terminal, such as a service, a radio resource, and mobility of the terminal.

Step 540: The terminal sends a first access request message to the RAN based on the dedicated access resource information of the first network slice.

Because each network slice has corresponding dedicated access resource information, the terminal sends the first access request message to the RAN on a dedicated resource based on the dedicated access resource information of the first network slice, so that the RAN quickly detects a network slice corresponding to a service function requested by the terminal, where the first access request message may include indication information (such as a preamble). Optionally, the first access request message may further include the attribute information of the terminal, such as the service, the radio resource, and the mobility of the terminal, so that the RAN quickly selects a network slice.

It should be noted that, subsequent step 550 to step 580 are the same as step 350 to step 380, and details are not described herein again.

The foregoing embodiment provided in the present invention is applied to model 2 with partially shared access resource information. The RAN determines the dedicated resource information of the at least one network slice based on the first attribute information of the at least one network slice, and distinguishes different network slices by using the dedicated resource information of the at least one network slice, and the RAN notifies, by using an initial access response, the terminal of the dedicated resource information of the at least one network slice, so that the terminal selects a to-be-accessed network slice. In this embodiment, the first attribute information of the at least one network slice of the core network may be prevented from being exposed on a radio interface, thereby improving security.

Figure 6:
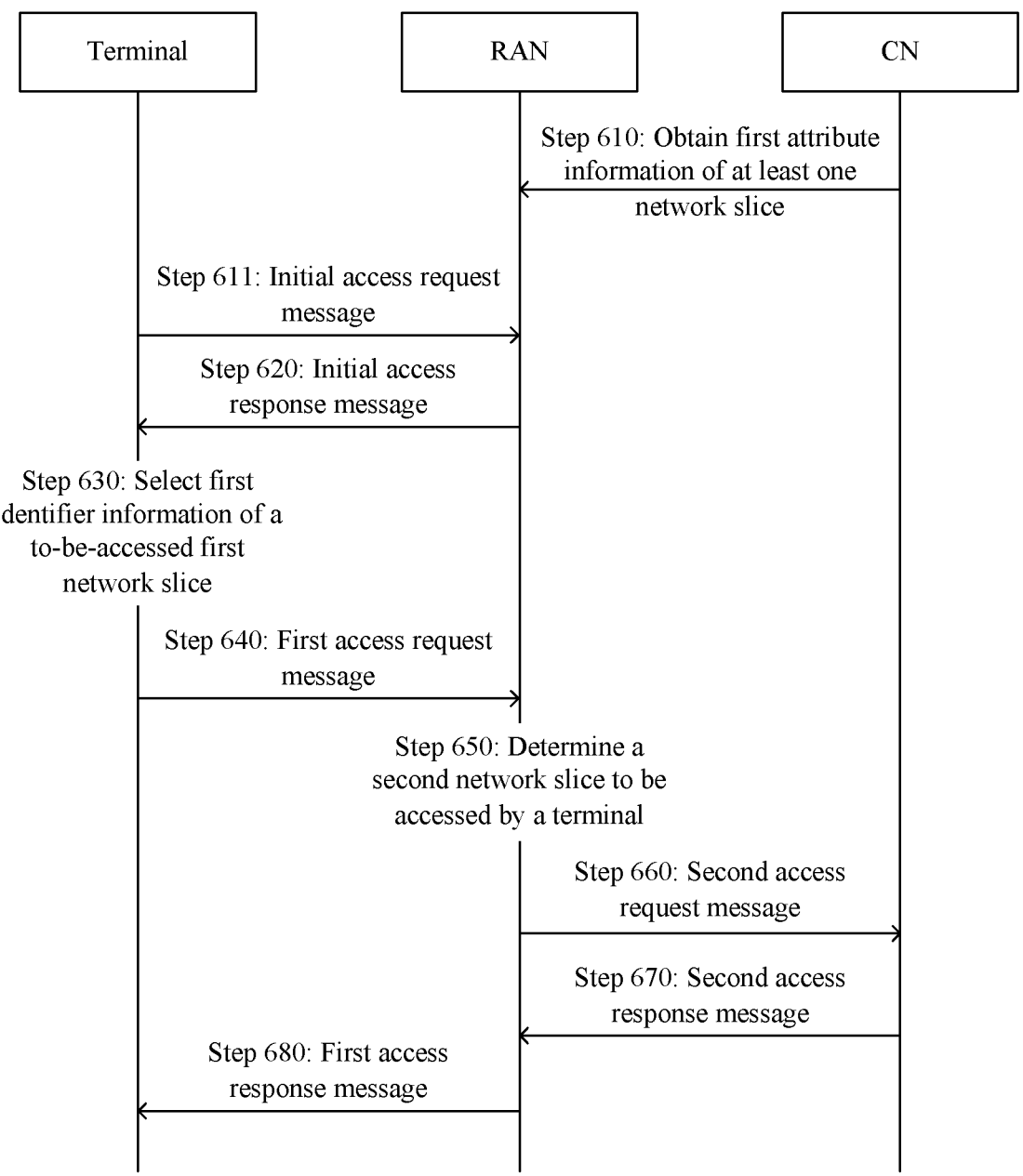
FIG. 6 is a signaling interaction diagram of still another network slice selection method shown in FIG. 3.

FIG. 6 is a signaling interaction diagram of still another network slice selection method shown in FIG. 3. As shown in FIG. 6, the method is applied to a mode 3 of a RAN. The method may include the following steps.

Step 610: The radio access device RAN obtains first attribute information of at least one network slice from a core network CN.

Step 620: The RAN sends a first message to a terminal, where the first message may include the first attribute information of the at least one network slice.

Optionally, before the RAN sends the first message to the terminal, the RAN sends a system message to the terminal, to send, to the terminal, indication information (such as a preamble) of a cell covered by the RAN.

The terminal sends a second message (such as an initial access request message) to the RAN on a common resource, where the second message may include indication information (such as a preamble), to indicate that the terminal is to access the RAN.

That the RAN sends a first message to a terminal is specifically: sending, by the RAN, the first message to the terminal based on the received second message, where the first message includes the first attribute information of the at least one network slice, and first attribute information of a network slice may be first identifier information of the network slice.

Step 630: The terminal selects first identifier information of a to-be-accessed first network slice based on the first attribute information of the at least one network slice.

The terminal selects the first identifier information of the to-be-accessed first network slice based on first identifier information of the at least one network slice.

The terminal selects the first identifier information of the to-be-accessed first network slice from the first identifier information of the at least one network slice based on attribute information of the terminal, such as a service, a radio resource, and mobility of the terminal.

Step 640: The terminal sends a first access request message to the RAN, where the first access request message includes the first identifier information of the first network slice.

The terminal sends the first access request message to the RAN on the common resource, where the first access request message may include the first identifier information of the first network slice.

Optionally, the first access request message may further include the attribute information of the terminal, such as the service, the radio resource, and the mobility of the terminal, so that the RAN quickly selects a network slice.

It should be noted that, subsequent step 650 to step 680 are the same as step 350 to step 380, and details are not described herein again.

The foregoing embodiment provided in the present invention is applied to model 3 with completely shared access resource information. Different network slices are directly distinguished by using the first identifier information of the at least one network slice, and the RAN notifies, by using an initial access response, the terminal of the first attribute information of the at least one network slice, so that the first attribute information of the at least one network slice of the core network may be prevented from being exposed on a radio interface, and security is improved.

Figure 7:
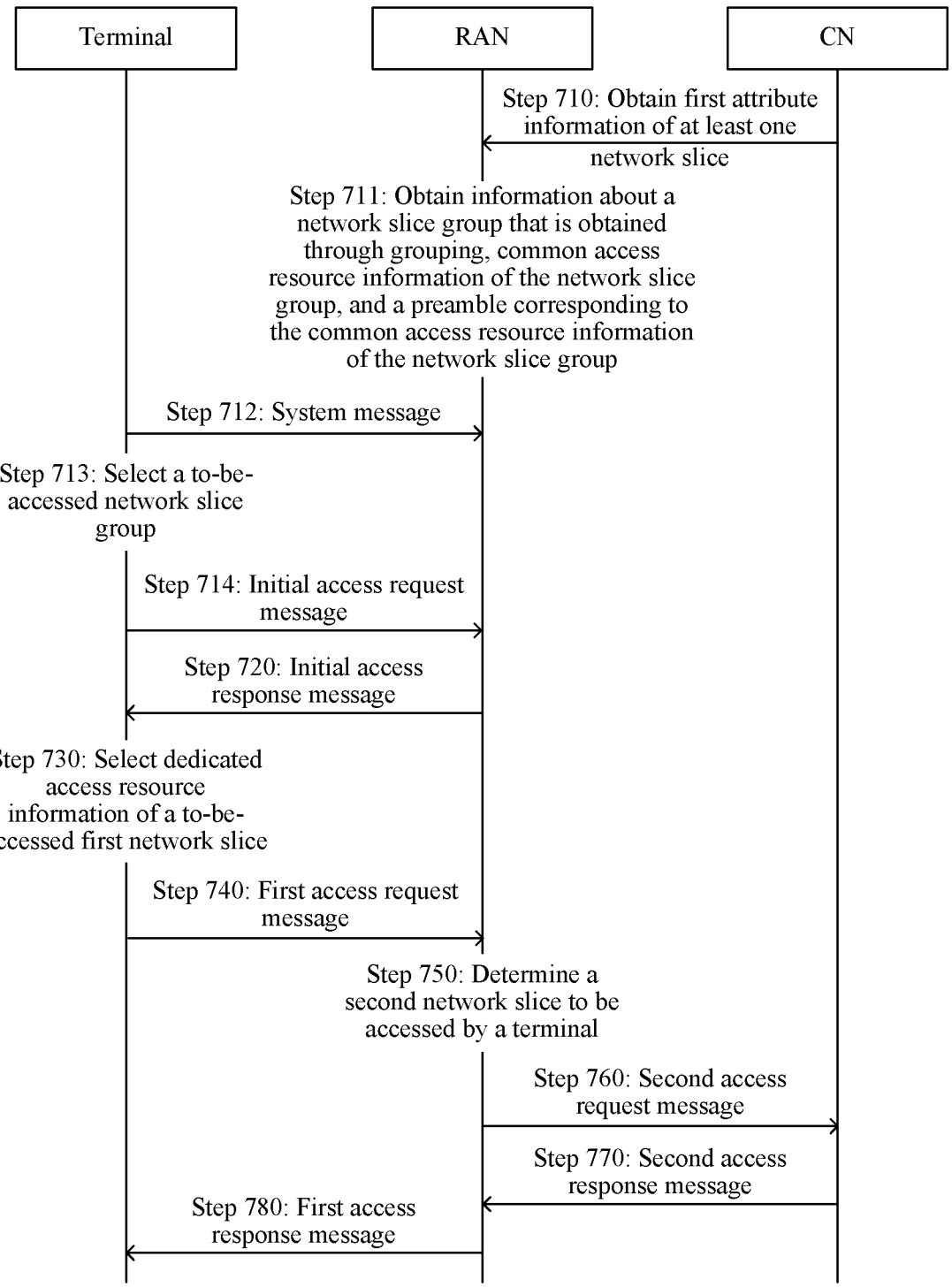
FIG. 7 is a signaling interaction diagram of still another network slice selection method shown in FIG. 3.

FIG. 7 is a signaling interaction diagram of still another network slice selection method shown in FIG. 3. As shown in FIG. 7, the method is applied to a mode 2 of a RAN. The method may include the following steps.

Step 710: The radio access device RAN obtains first attribute information of at least one network slice from a core network CN.

Step 720: The RAN sends a first message to a terminal, where the first message may include the first attribute information of the at least one network slice.

Optionally, before the RAN sends the first message to the terminal, the RAN determines dedicated access resource information of the at least one network slice and common access resource information of the at least one network slice based on the first attribute information of the at least one network slice.

The RAN groups the at least one network slice based on the common access resource information of the network slice, to obtain a network slice group. The RAN performs preamble allocation on the network slice group, to obtain information of the network slice group that is obtained through grouping, common access resource information of the network slice group, and a preamble corresponding to the common access resource information of the network slice group.

In an example, the RAN groups 10 network slices into two groups based on common access resource information of the network slices, where each group has the same common access resource information, and each group includes five network slices. The RAN performs preamble allocation on the two network slice groups, where each group has a group of preambles. It may be understood that five network slices in each group have respective dedicated access resource information.

Optionally, the RAN sends a second message to the terminal, where the second message may include the common access resource information of the network slice group, the information about the network slice group, and the preamble corresponding to the common access resource information of the network slice group, and the second message may be broadcast system information.

The terminal selects a to-be-accessed network slice group based on the common access resource information of the network slice group, the information about the network slice group, and the preamble corresponding to the common access resource information of the network slice group that are received.

The terminal sends a third message to the RAN, where the third message may include a preamble of the to-be-accessed network slice group.

The RAN determines, based on the received preamble of the network slice group, the network slice group selected by the terminal.

That the RAN sends a first message to a terminal specifically includes: sending, by the RAN, the first message to the terminal based on the network slice group, where the first message includes dedicated access resource information of each network slice in the network slice group and first attribute information of each network slice in the network slice group.

Step 730: The terminal selects dedicated access resource information of a to-be-accessed first network slice based on the first attribute information of the at least one network slice.

The terminal selects, based on attribute information of the terminal, such as a service, a radio resource, and mobility of the terminal, the dedicated access resource information of the to-be-accessed first network slice from the dedicated access resource information of each network slice and the first attribute information of the at least one network slice.

Step 740: The terminal sends a first access request message to the RAN based on the dedicated access resource information of the first network slice.

Because each network slice has corresponding dedicated access resource information, the terminal sends the first access request message to the RAN on a dedicated resource based on the dedicated access resource information of the first network slice, so that the RAN quickly detects a network slice corresponding to a service function requested by the terminal, where the first access request message may include indication information (such as a preamble).

Optionally, the first access request message may further include the attribute information of the terminal, such as the service, the radio resource, and the mobility of the terminal, so that the RAN quickly selects a network slice.

It should be noted that, subsequent step 750 to step 780 are the same as step 350 to step 380, and details are not described herein again.

According to the foregoing embodiment provided in the present invention, dedicated access resource information used by the terminal is used to indicate the dedicated access resource information of the first network slice selected by the terminal. The network slice information is grouped on a RAN side; a common part of dedicated access resource information of each network slice group is determined, namely, common access resource information is obtained; and a special part for each network slice is determined, namely, dedicated access resource information is obtained. The RAN groups preambles based on the common access resource information of the network slices, where each group of preambles is corresponding to common access resource information of one network slice group. The RAN sends, to the terminal based on the network slice group that is selected by the terminal and that is corresponding to the common access resource information, the dedicated access resource information of each network slice in the network slice group and the first attribute information of each network slice, so that the terminal selects a to-be-accessed network slice.

Figure 8:
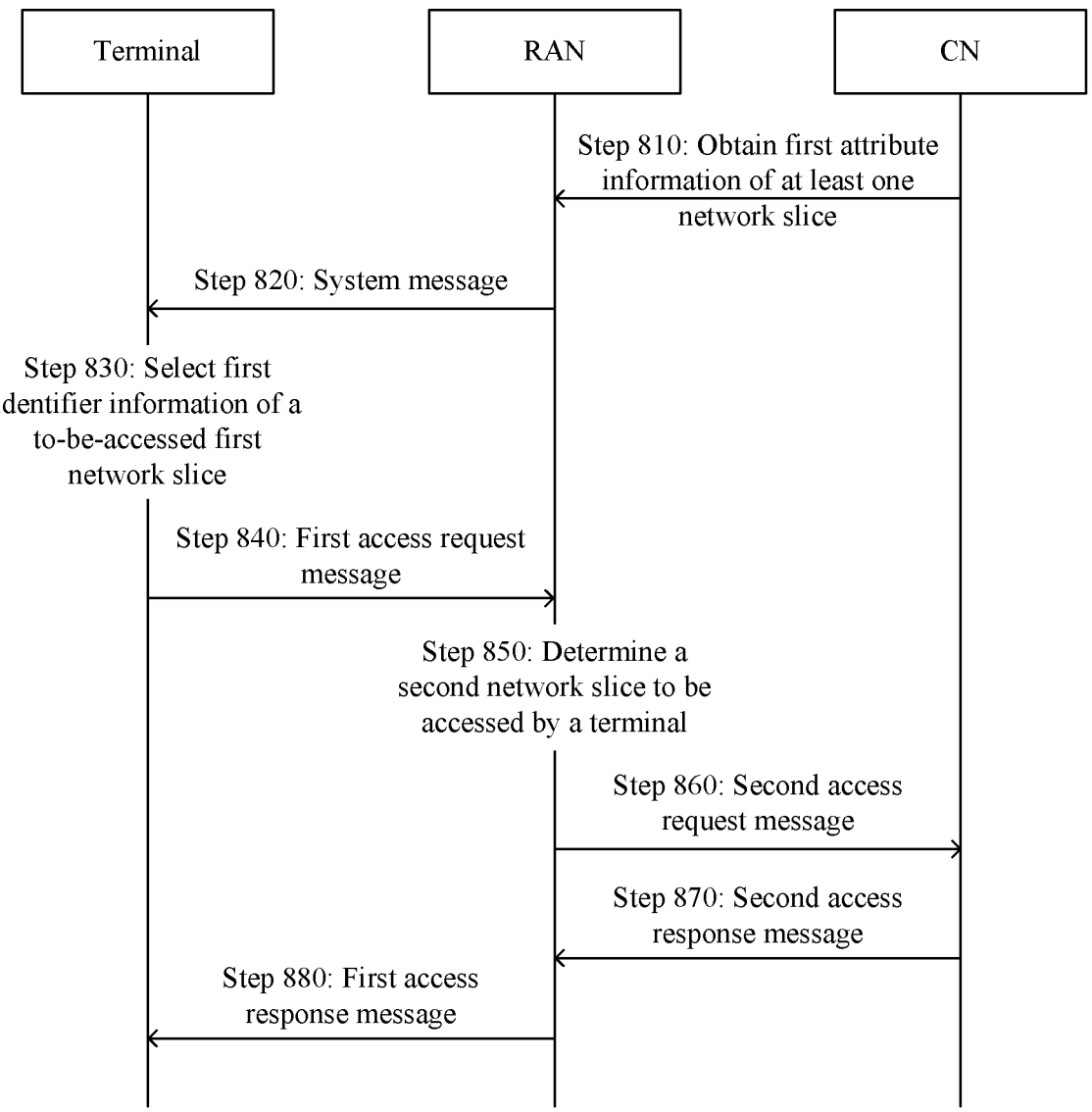
FIG. 8 is a signaling interaction diagram of still another network slice selection method shown in FIG. 3.

FIG. 8 is a signaling interaction diagram of another network slice selection method shown in FIG. 3. The method is applied to a mode 3 of a RAN. As shown in FIG. 8, the method may include the following steps.

Step 810: The radio access device RAN obtains first attribute information of at least one network slice from a core network CN.

Step 820: The RAN sends a first message to a terminal, where the first message may include the first attribute information of the at least one network slice.

First attribute information of a network slice may be first identifier information of the network slice.

Step 830: The terminal selects first identifier information of a to-be-accessed first network slice based on the first attribute information of the at least one network slice.

The terminal selects the first identifier information of the to-be-accessed first network slice based on the first identifier information of the at least one network slice.

The terminal selects, based on attribute information of the terminal, such as a service, a radio resource, and mobility of the terminal, attribute information of the to-be-accessed first network slice from the first identifier information of the at least one network slice, where the attribute information may be the first identifier information of the first network slice.

Step 840: The terminal sends a first access request message to the RAN, where the first access request message includes the first identifier information of the first network slice.

The terminal sends the first access request message to the RAN on a common resource, where the first access request message may include the first identifier information of the first network slice.

Optionally, the first access request message may further include the attribute information of the terminal, such as the service, the radio resource, and the mobility of the terminal, so that the RAN quickly selects a network slice.

It should be noted that, subsequent step 850 to step 880 are the same as step 350 to step 380, and details are not described herein again.

The foregoing embodiment provided in the present invention is applied to model 3 with completely shared access resource information. Different network slices are directly distinguished by using the first identifier information of the at least one network slice, and the RAN notifies, by using an initial access response, the terminal of the first attribute information of the at least one network slice, so that the terminal selects a to-be-accessed network slice.

Figure 9:
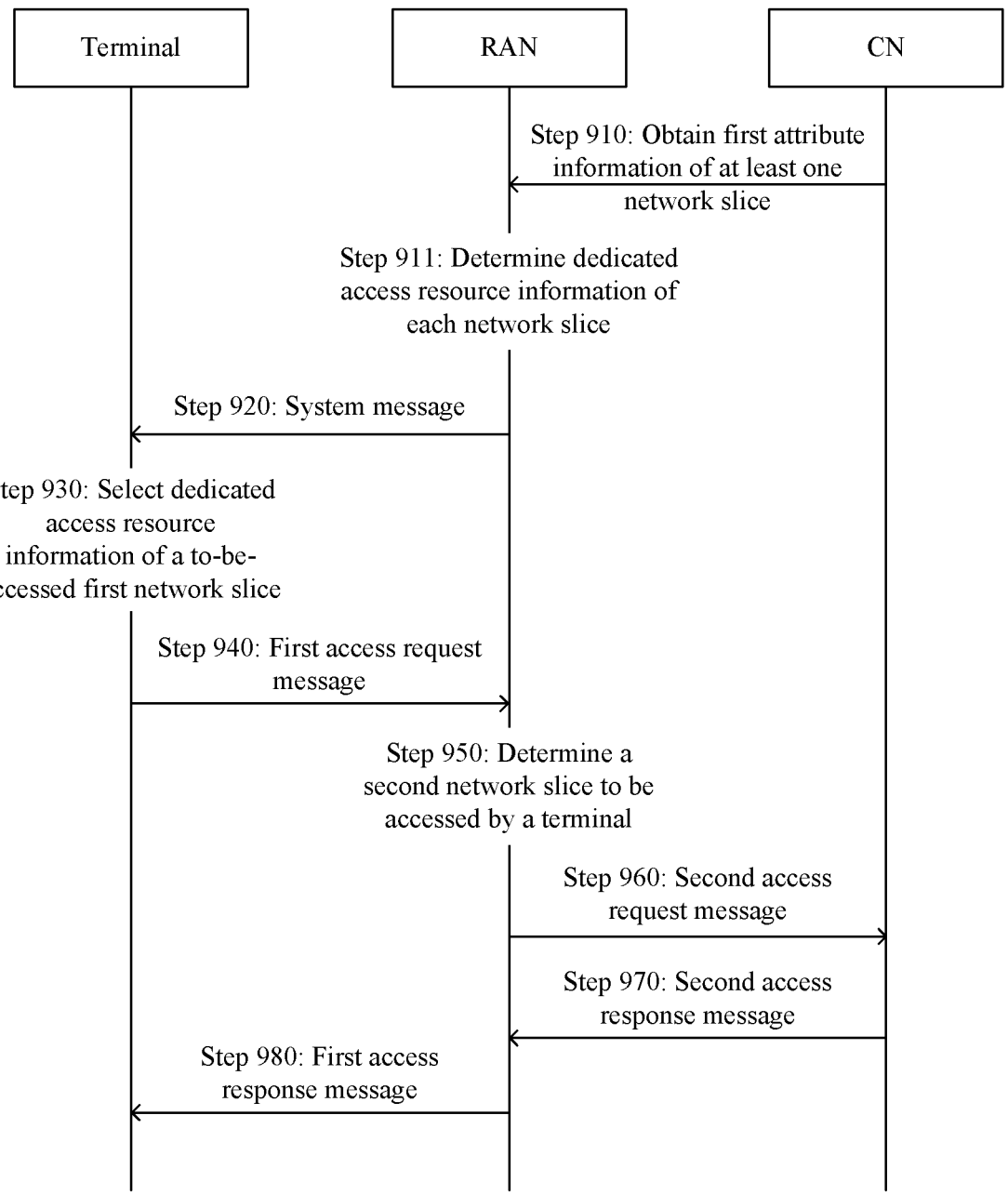
FIG. 9 is a signaling interaction diagram of still another network slice selection method shown in FIG. 3.

FIG. 9 is a signaling interaction diagram of still another network slice selection method shown in FIG. 3. The method is applied to a mode 1 of a RAN. As shown in FIG. 9, the method may include the following steps.

Step 910: The radio access device RAN obtains first attribute information of at least one network slice from a core network CN.

Step 920: The RAN sends a first message to a terminal, where the first message may include the first attribute information of the at least one network slice.

Optionally, before the RAN sends the first message to the terminal, the RAN determines dedicated access resource information of each network slice based on the first attribute information of the at least one network slice.

That the RAN sends a first message to a terminal in step 920 is specifically: sending, by the RAN, the first message to the terminal, where the first message may include the dedicated access resource information of each network slice and the first attribute information of the at least one network slice, and the first message may be a system message.

Step 930: The terminal selects dedicated resource information of a to-be-accessed first network slice based on the first attribute information of the at least one network slice.

The terminal selects the dedicated resource information of the to-be-accessed first network slice from the first attribute information of the at least one network slice and the dedicated access resource information of each network slice based on attribute information of the terminal, such as a service, a radio resource, and mobility of the terminal.

Step 940: The terminal sends a first access request message to the RAN based on the dedicated access resource information of the first network slice.

Because each network slice has corresponding dedicated access resource information, the terminal sends the first access request message to the RAN on a dedicated resource based on the dedicated access resource information of the first network slice, so that the RAN quickly detects a network slice corresponding to a service function requested by the terminal, where the first access request message may include indication information (such as a preamble).

Optionally, the first access request message may further include the attribute information of the terminal, such as the service, the radio resource, and the mobility of the terminal. It should be noted that, subsequent steps are the same as step 350 to step 380, and details are not described herein again.

The foregoing embodiment provided in the present invention is applied to model 1 with completely separated access resource information. The RAN determines the dedicated resource information of the at least one network slice based on the first attribute information of the at least one network slice, and distinguishes different network slices by using the dedicated resource information of the at least one network slice, and the RAN notifies, by using an initial access response, the terminal of the dedicated resource information of the at least one network slice, so that the terminal selects a to-be-accessed network slice.

Figure 10:
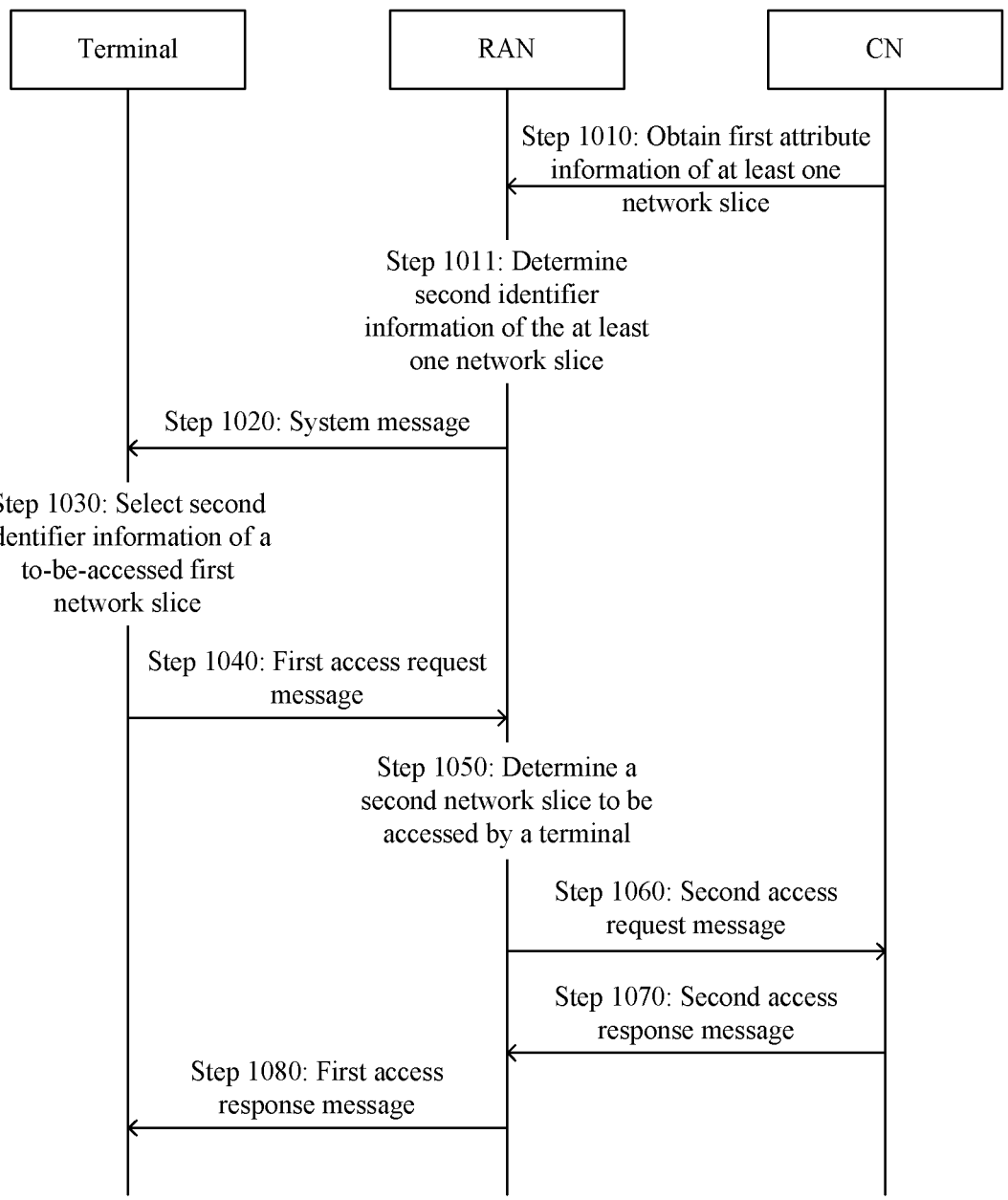
FIG. 10 is a signaling interaction diagram of still another network slice selection method shown in FIG. 3.

FIG. 10 is a signaling interaction diagram of still another network slice selection method shown in FIG. 3. The method is applied to a mode 3 of a RAN. As shown in FIG. 10, the method may include the following steps.

Step 1010: The radio access device RAN obtains first attribute information of at least one network slice from a core network CN.

Step 1020: The RAN sends a first message to a terminal, where the first message may include the first attribute information of the at least one network slice.

Optionally, before the RAN sends the first message to the terminal, the RAN determines second identifier information of the at least one network slice based on the first attribute information of the at least one network slice.

That the RAN sends a first message to a terminal specifically includes: sending, by the RAN, the first message to the terminal, where the first message may include the second identifier information of the at least one network slice and the first attribute information of the at least one network slice, and the first message may be a system message.

Step 1030: The terminal selects second identifier information of a to-be-accessed first network slice based on the first attribute information of the at least one network slice.

The terminal selects the second identifier information of the to-be-accessed first network slice based on the second identifier information of the at least one network slice and the first attribute information of the at least one network slice.

The terminal selects, based on attribute information of the terminal, such as a service, a radio resource, and mobility of the terminal, second attribute information of the to-be-accessed first network slice from the second identifier information of the at least one network slice, where the attribute information may be the second identifier information of the first network slice.

Step 1040: The terminal sends a first access request message to the RAN, where the first access request message includes the second identifier information of the first network slice.

The terminal sends the first access request message to the RAN on a common resource, where the first access request message may include the second identifier information of the first network slice.

Optionally, the first access request message may further include the attribute information of the terminal, such as the service, the radio resource, and the mobility of the terminal.

It should be noted that, subsequent step 1050 to step 1080 are the same as step 350 to step 380, and details are not described herein again.

The foregoing embodiment provided in the present invention is applied to model 1 with completely shared access resource information. The RAN determines the second identifier information of the at least one network slice based on the first attribute information of the at least one network slice, and distinguishes different network slices by using the second identifier information of the at least one network slice, and the RAN notifies, by using an initial access response, the terminal of the first attribute information of the at least one network slice and the second identifier information of the at least one network slice, so that the terminal selects a to-be-accessed network slice.

Corresponding to the foregoing network slice selection methods in FIG. 3 to FIG. 10, an embodiment of the present invention provides a radio access device.

Figure 11:
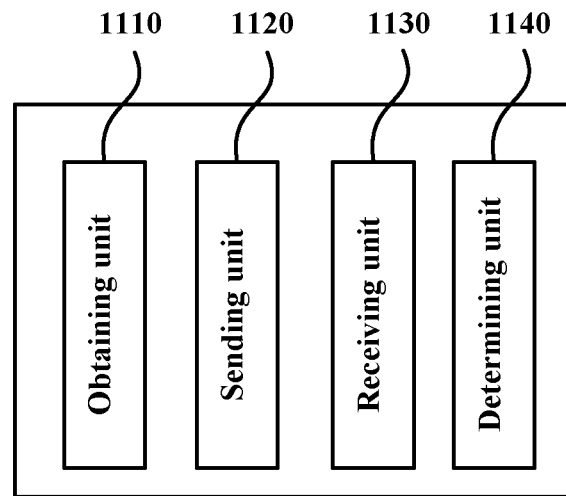
FIG. 11 is a schematic structural diagram of a radio access device according to an embodiment of the present invention.

FIG. 11 is a schematic structural diagram of a radio access device according to an embodiment of the present invention. As shown in FIG. 11, the radio access device may include an obtaining unit 1110, a sending unit 1120, a receiving unit 1130, and a determining unit 1140.

The obtaining unit 1110 is configured to obtain network slice information.

Optionally, the obtaining unit 1110 may obtain the network slice information from a core network CN or operation, administration and maintenance OAM.

The sending unit 1120 is configured to send a first message to a terminal, where the first message includes the network slice information obtained by the obtaining unit 1110.

The receiving unit 1130 is configured to receive a first access request message that is sent by the terminal after the terminal selects, based on the network slice information, second attribute information of a first network slice to be accessed by the terminal.

The determining unit 1140 is configured to determine, based on the second attribute information of the first network slice, a second network slice to be accessed by the terminal, where the first network slice is the same as or different from the second network slice.

Optionally, when the network slice information includes first attribute information of at least one network slice, before the sending unit 1120 sends the first message to the terminal, the determining unit 1140 is further configured to determine dedicated access resource information of each network slice based on the first attribute information of the at least one network slice.

The sending unit 1120 is specifically configured to send the first message to the terminal, where the first message includes the first attribute information of the at least one network slice and the dedicated access resource information of each network slice.

The receiving unit 1130 is specifically configured to receive the first access request message that is sent by the terminal after the terminal selects, based on the first attribute information of the at least one network slice and the dedicated access resource information of each network slice, the second attribute information of the first network slice to be accessed by the terminal.

Optionally, when the network slice information includes first identifier information of at least one network slice, the sending unit 1120 is specifically configured to send the first message to the terminal, where the first message includes the first identifier information of the at least one network slice.

The receiving unit 1130 is specifically configured to receive the first access request message that is sent by the terminal after the terminal selects the second attribute information of the first network slice based on the first identifier information of the at least one network slice, where the first access request message includes first identifier information of the first network slice.

Optionally, before the sending unit 1120 sends the first message to the terminal, the receiving unit 1130 is further configured to receive a third message sent by the terminal, where the third message includes indication information indicating that the terminal is to access the RAN.

The sending unit 1120 is further configured to send the first message to the terminal based on the indication information.

Optionally, when the network slice information includes first attribute information of at least one network slice, before the sending unit 1120 sends the first message to the terminal, the determining unit 1140 is further configured to determine dedicated access resource information of the at least one network slice and common access resource information of the at least one network slice based on the first attribute information of the at least one network slice.

The obtaining unit 1110 is further configured to perform preamble allocation on the network slice based on the common access resource information of the network slice, to obtain information about a network slice group that is obtained through grouping, common access resource information of the network slice group, and a preamble corresponding to the common access resource information of the network slice group.

The sending unit 1120 is further configured to send a fourth message to the terminal, where the fourth message includes the common access resource information of the network slice group, the information about the network slice group, and the preamble corresponding to the common access resource information of the network slice group.

The receiving unit 1130 is further configured to receive a fifth message sent by the terminal, where the fifth message includes a preamble of a network slice group that is to be accessed by the terminal and that is selected by the terminal based on the common access resource information of the network slice group, the information about the network slice group, and the preamble corresponding to the common access resource information of the network slice group.

The determining unit 1140 is further configured to determine, based on the preamble of the network slice group, the network slice group selected by the terminal.

Then, the sending unit 1120 is specifically configured to send the first message to the terminal based on the network slice group, where the first message includes dedicated access resource information of each network slice in the network slice group and second attribute information of each network slice in the network slice group.

The receiving unit 1130 is specifically configured to receive the first access request message that is sent by the terminal after the terminal selects, based on the first attribute information of the at least one network slice and the dedicated access resource information of each network slice, the second attribute information of the first network slice to be accessed by the terminal and dedicated access resource information of the first network slice.

Optionally, when the network slice information includes first attribute information of at least one network slice, before the sending unit 1120 sends the first message to the terminal, the determining unit 1140 is further configured to determine second identifier information of each network slice based on the first attribute information of the at least one network slice.

The sending unit 1120 is specifically configured to send the first message to the terminal, where the first message includes the second identifier information of each network slice.

The receiving unit 1130 is specifically configured to receive the first access request message that is sent by the terminal after the terminal selects second identifier information of the first network slice based on the second identifier information of the at least one network slice and the first attribute information of the at least one network slice, where the first access request message includes the second identifier information of the first network slice.

Optionally, the determining unit 1140 is specifically configured to: when radio resource information of a network slice supported by the RAN does not satisfy a service function supported by the second attribute information of the first network slice, the determining unit 1140 instructs the sending unit 1120 to send an access request rejection message to the terminal; or the determining unit 1140 selects, for the terminal, a second network slice with a service function the same as that supported by the second attribute information of the first network slice, where the first network slice is different from the second network slice.

When radio resource information of a network slice supported by the RAN satisfies a service function supported by the second attribute information of the first network slice, the determining unit 1140 determines the second network slice to be accessed by the terminal, where the first network slice is the same as the second network slice.

Optionally, the first access request message further includes attribute information of the terminal.

The determining unit 1140 is specifically configured to: when the attribute information of the terminal does not satisfy a service function supported by the second attribute information of the first network slice, the determining unit 1140 instructs the sending unit 1120 to send an access request rejection message to the terminal; or the determining unit 1140 selects, for the terminal, a second network slice with a service function the same as that supported by the second attribute information of the first network slice, where the first network slice is different from the second network slice.

When the attribute information of the terminal satisfies a service function supported by the attribute information of the first network slice, the determining unit 1140 determines the second network slice to be accessed by the terminal, where the first network slice is the same as the second network slice.

Optionally, the sending unit 1120 is further configured to send a second access request message to a CN, where the second access request message includes first attribute information of the second network slice that is to be accessed by the terminal and that is determined by the determining unit 1140.

The receiving unit 1130 is further configured to receive a second access response message that is sent by the CN based on second attribute information of the second network slice that is to be accessed by the terminal and that is determined by the determining unit 1140.

The sending unit 1120 sends a first access response message to the terminal, where the first access response message includes the first attribute information of the second network slice that is to be accessed by the terminal and that is selected by the CN, so that the terminal accesses the second network slice.

Functions of the units of the radio access device in this embodiment of the present invention may be implemented by corresponding steps in the foregoing embodiments of the network slice selection methods in FIG. 3 to FIG. 10. Therefore, a specific working process of the radio access device provided in the present invention is not described herein again.

Corresponding to the foregoing network slice selection methods in FIG. 3 to FIG. 10, an embodiment of the present invention provides a terminal.

Figure 12:
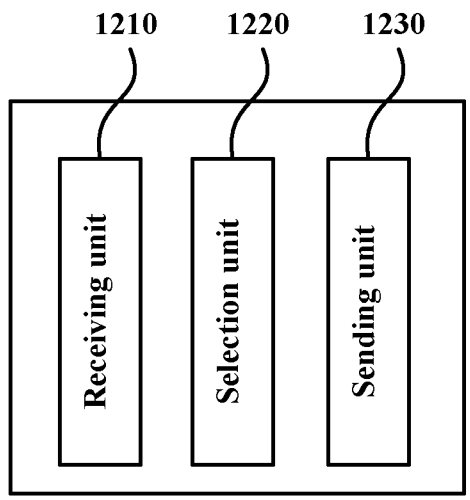
FIG. 12 is a schematic structural diagram of a terminal according to an embodiment of the present invention.

FIG. 12 is a schematic structural diagram of a terminal according to an embodiment of the present invention. As shown in FIG. 12, the terminal may include a receiving unit 1210, a selection unit 1220, and a sending unit 1230.

The receiving unit 1210 is configured to receive a first message sent by a RAN, where the first message includes network slice information obtained by the RAN.

The selection unit 1220 is configured to select, based on the network slice information received by the receiving unit 1210, second attribute information of a to-be-accessed first network slice.

The sending unit 1230 is configured to send a first access request message to the RAN based on the second attribute information of the first network slice selected by the selection unit 1220, so that the RAN determines a second network slice to be accessed by the terminal, where the first network slice is the same as or different from the second network slice.

Optionally, when the network slice information includes first attribute information of at least one network slice, the receiving unit 1210 is specifically configured to receive, for the terminal, the first message sent by the RAN, where the first message includes the first attribute information of the at least one network slice and dedicated access resource information of each network slice that is determined by the RAN based on the first attribute information of the at least one network slice.

The selection unit 1220 is specifically configured to select dedicated access resource information of the to-be-accessed first network slice based on the first attribute information of the at least one network slice and the dedicated access resource information of each network slice.

The sending unit 1230 is specifically configured to send the first access request message to the RAN on a dedicated access resource of the first network slice based on the dedicated access resource information of the first network slice.

Optionally, when the network slice information includes first identifier information of at least one network slice, the receiving unit 1210 is specifically configured to receive the first message sent by the RAN, where the first message includes the first identifier information of the at least one network slice.

The selection unit 1220 is specifically configured to select first identifier information of the to-be-accessed first network slice based on the first identifier information of the at least one network slice.

The sending unit 1230 is specifically configured to send the first access request message to the RAN based on the first identifier information of the first network slice, where the first access request message includes the first identifier information of the first network slice.

Optionally, before the receiving unit 1210 receives the first message sent by the RAN, the sending unit 1230 is further configured to send a second message to the RAN, where the second message includes indication information indicating that the terminal is to access the RAN.

The receiving unit 1210 is further configured to receive the first message that is sent by the RAN based on the indication information.

Optionally, when the network slice information includes first attribute information of at least one network slice, before the receiving unit 1210 receives the first message sent by the RAN, the receiving unit 1210 is further configured to receive a third message sent by the RAN, where the third message includes common access resource information of the at least one network slice and dedicated access resource information of the at least one network slice that are determined by the RAN based on the first attribute information of the at least one network slice, and information about a network slice group that is obtained through grouping, common access resource information of the network slice group, and a preamble corresponding to the common access resource information of the network slice group that are obtained by the RAN by performing preamble allocation on the network slice based on the common access resource information of the network slice.

The selection unit 1220 is further configured to select a to-be-accessed network slice group based on the information about the network slice group, the common access resource information of the network slice group, and the preamble corresponding to the common access resource information of the network slice group.

The sending unit 1230 is further configured to send a fourth message to the RAN, where the fourth message includes a preamble of the to-be-accessed network slice group.

Then, the receiving unit 1210 is specifically configured to receive the first message that is sent by the RAN after the RAN determines the network slice group based on the preamble of the network slice group, where the first message includes dedicated access resource information of each network slice in the network slice group and attribute information of each network slice in the network slice group.

The selection unit 1220 is specifically configured to select dedicated access resource information of the to-be-accessed first network slice based on the dedicated access resource information of each network slice in the network slice group and the attribute information of each network slice in the network slice group.

The sending unit 1230 is specifically configured to send the first access request message to the RAN on a dedicated access resource of the first network slice based on the dedicated access resource information of the first network slice.

Optionally, when the network slice information includes first attribute information of at least one network slice, the receiving unit 1210 is specifically configured to receive the first message sent by the RAN, where the first message includes second identifier information of the at least one network slice that is determined by the RAN based on the first attribute information of the at least one network slice.

The selection unit 1220 is specifically configured to select second identifier information of the to-be-accessed first network slice based on the second identifier information of the at least one network slice.

The sending unit 1230 is specifically configured to send the first access request message to the RAN based on the second identifier information of the first network slice, where the first access request message includes the second identifier information of the first network slice.

Optionally, when the network slice information includes first attribute information of at least one network slice, the selection unit 1220 is specifically configured to select second attribute information of the to-be-accessed first network slice from the first attribute information of the at least one network slice based on attribute information of the terminal.

Optionally, the receiving unit 1210 is further configured to receive a first access response message that is sent by the RAN based on first attribute information of the second network slice, where the first access response message includes the first attribute information of the second network slice that is to be accessed by the terminal and that is selected by a core network CN, so that the terminal accesses the second network slice.

Functions of the units of the terminal in this embodiment of the present invention may be implemented by corresponding steps in the foregoing embodiments of the network slice selection methods in FIG. 3 to FIG. 10. Therefore, a specific working process of the terminal provided in the present invention is not described herein again.

Corresponding to the foregoing network slice selection methods in FIG. 3 to FIG. 10, an embodiment of the present invention provides another radio access device.

Figure 13:
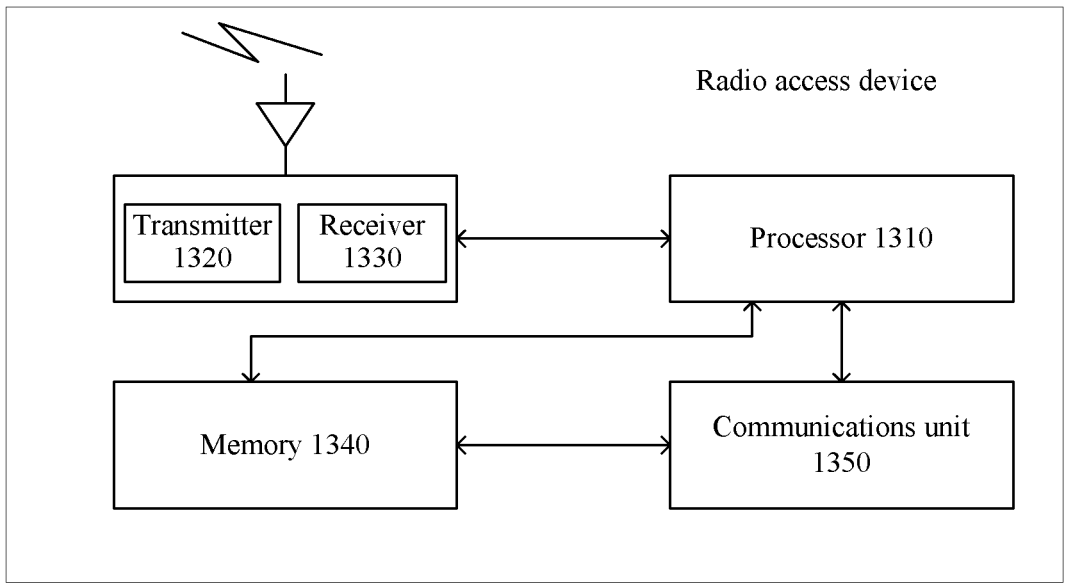
FIG. 13 is a schematic structural diagram of another radio access device according to an embodiment of the present invention.

FIG. 13 is a schematic structural diagram of another radio access device according to an embodiment of the present invention. As shown in FIG. 13, the radio access device may include a processor 1310, a transmitter 1320, and a receiver 1330.

The processor 1310 and the transmitter 1320 are configured to support information reception and transmission between the RAN and the terminal in the foregoing embodiment, and support radio communication between the terminal and another terminal. The processor 1310 executes various functions for performing communication with the terminal. In uplink, an uplink signal from the terminal is received by the receiver 1330, and is further processed by the processor 1310 to restore service data and signaling information sent by the terminal. In downlink, service data and a signaling message are processed by the processor 1310, and a processed signal is sent to the terminal by using the transmitter 1320.

Specifically, the processor 1310 is configured to obtain network slice information. The processor 1310 may obtain the network slice information from a core network CN or operation, administration and maintenance OAM.

The transmitter 1320 is configured to send a first message to the terminal, where the first message includes the network slice information.

The receiver 1330 is configured to receive a first access request message that is sent by the terminal after the terminal selects, based on the network slice information, first attribute information of a first network slice to be accessed by the terminal.

The processor 1310 is further configured to determine, based on the first attribute information of the first network slice, a second network slice to be accessed by the terminal, where the first network slice is the same as or different from the second network slice.

The radio access device may further include: a memory 1340, configured to store program code and data of the radio access device, and a communications unit 1350, where the communications unit 1350 is configured to support communication with another network entity, for example, is configured to support communication between the radio access device and a core network entity.

Figure 14:
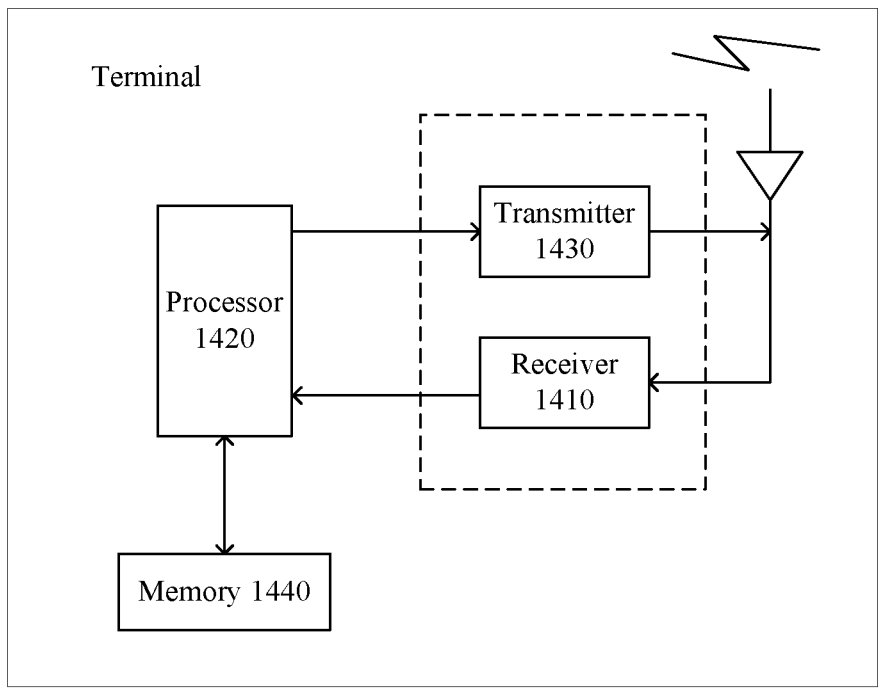
FIG. 14 is a schematic structural diagram of another terminal according to an embodiment of the present invention.

FIG. 14 is a schematic structural diagram of another terminal according to an embodiment of the present invention. As shown in FIG. 14, the terminal may include a receiver 1410, a processor 1420, and a transmitter 1430.

The transmitter 1430 may adjust an output sample and generate an uplink signal, where the uplink signal is transmitted to the RAN in the foregoing embodiment by using the transmitter 1430. In downlink, the receiver 1410 receives a downlink signal transmitted by the RAN in the foregoing embodiment. The receiver 1410 receives the signal and provides an input sample. The processor 1420 receives service data and a signaling message that are to be sent in uplink, and processes the service data and the signaling message.

Specifically, the receiver 1410 is configured to receive a first message sent by the RAN, where the first message includes network slice information obtained by the RAN.

The processor 1420 is configured to select first attribute information of a to-be-accessed first network slice based on the network slice information received by the receiving unit.

The transmitter 1430 is configured to send a first access request message to the RAN based on the first attribute information of the first network slice selected by the selection unit, so that the RAN determines a second network slice to be accessed by the terminal, where the first network slice is the same as or different from the second network slice.

The terminal may further include a memory 1440, configured to store program code and data of the terminal.

It should be noted that, the processor for performing the foregoing radio access device or terminal in the present invention may be a central processing unit (CPU), a general purpose processor, a digital signal processor (digital signal processing, DSP), an application-specific integrated circuit (application-specific integrated circuit, ASIC), a field-programmable gate array (field-programmable gate array, FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

A person skilled in the art may be further aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method of the embodiments may be implemented by a program instructing a processor. The foregoing program may be stored in a computer readable storage medium. The storage medium is a non-transitory (non-transitory) medium, such as a random access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely example embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network slice selection method performed by a terminal, comprising:
   receiving network slice information from a radio access network (RAN), wherein the network slice information comprises first attribute information of at least two network slices of a first network; and
   sending, based on the network slice information, a first access request message to the RAN,
   wherein the first access request message comprises second attribute information of a first network slice of the at least two network slices.

2. The network slice selection method of claim 1, wherein the first access request message indicates slice information to be accessed by the terminal.

3. The network slice selection method of claim 1, wherein the first attribute information comprises one or more of the following:
   first identifier information of the at least two network slices;
   key service attribute information of the at least two network slices;
   information about a service supported by the at least two network slices;
   authorization information of the at least two network slices;
   core network load information of the at least two network slices; or
   coverage information of the at least two network slices.

4. The network slice selection method of claim 3, wherein when the first attribute information comprises the authorization information of the at least two network slices, the network slice selection method further comprises selecting third attribute information of a network slice corresponding to an authorized network slice as the second attribute information.

5. The network slice selection method of claim 1, wherein the first access request message comprises a Radio Resource Control (RRC) connection request message or an RRC connection setup complete message.

6. The network slice selection method of claim 1, wherein the first attribute information comprises attribute information of the terminal.

7. The network slice selection method of claim 1, wherein the first attribute information is comprised in a broadcast system message or an access response message.

8. The network slice selection method of claim 1, wherein the second attribute information comprises one or more of the following:
- identifier information of the first network slice;
- an indication of dedicated access resource information;
- a preamble of the first network slice;
- a signal of the first network slice; or
- a sequence of the first network slice.

9. A computer program product comprising computer-executable instructions stored on a non-transitory computer-readable medium that, when executed by a processor, cause a terminal to:
- receive network slice information from a radio access network (RAN), wherein the network slice information comprises first attribute information of at least two network slices of a first network; and
- send, based on the network slice information, a first access request message to the RAN,
- wherein the first access request message comprises second attribute information of a first network slice of the at least two network slices.

10. The computer program product of claim 9, wherein the first access request message comprises a Radio Resource Control (RRC) connection request message or an RRC connection setup complete message.

11. The computer program product of claim 9, wherein the first attribute information comprises attribute information of the terminal.

12. The computer program product of claim 9, wherein the first attribute information is comprised in a broadcast system message or an access response message.

13. A network slice selection method performed by a radio access network (RAN), comprising:
- sending network slice information to a terminal, wherein the network slice information comprises first attribute information of at least two network slices of a first network; and
- receiving, based on the network slice information, a first access request message from the terminal,
- wherein the first access request message comprises second attribute information of a first network slice of the at least two network slices.

14. The network slice selection method of claim 13, wherein the first access request message indicates slice information to be accessed by the terminal.

15. The network slice selection method of claim 13, wherein the first attribute information comprises one or more of the following:
- first identifier information of the at least two network slices;
- key service attribute information of the at least two network slices;
- information about a service supported by the at least two network slices;
- authorization information of the at least two network slices;
- core network load information of the at least two network slices; or
- coverage information of the at least two network slices.

16. The network slice selection method of claim 15, wherein when the first attribute information comprises the authorization information of the at least two network slices, the second attribute information comprises third attribute information of a network slice corresponding to an authorized network slice.

17. The network slice selection method of claim 13, wherein the first access request message comprises a Radio Resource Control (RRC) connection request message or an RRC connection setup complete message.

18. The network slice selection method of claim 13, wherein the first attribute information comprises attribute information of the terminal.

19. The network slice selection method of claim 13, wherein the first attribute information is comprised in a broadcast system message or an access response message.

20. The network slice selection method of claim 13, wherein the second attribute information comprises one or more of the following:
- identifier information of the first network slice;
- an indication of dedicated access resource information;
- a preamble of the first network slice;
- a signal of the first network slice; or
- a sequence of the first network slice.

* * * * *